US010320481B2

(12) United States Patent
Wang et al.

(10) Patent No.: US 10,320,481 B2
(45) Date of Patent: Jun. 11, 2019

(54) FLEXIBLE HIGH THROUGHPUT SATELLITE SYSTEM USING OPTICAL GATEWAYS

(71) Applicant: Space Systems/Loral, LLC, Palo Alto, CA (US)

(72) Inventors: Leah Wang, Fremont, CA (US); Vijaya Gallagher, Palo Alto, CA (US); Ghislain Turgeon, San Jose, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 0 days.

(21) Appl. No.: 15/633,007

(22) Filed: Jun. 26, 2017

(65) Prior Publication Data
US 2018/0019816 A1 Jan. 18, 2018

Related U.S. Application Data

(60) Provisional application No. 62/362,010, filed on Jul. 13, 2016.

(51) Int. Cl.
*H04B 10/118* (2013.01)
*H04B 7/185* (2006.01)
(Continued)

(52) U.S. Cl.
CPC ....... *H04B 10/118* (2013.01); *H04B 7/18515* (2013.01); *H04B 7/18517* (2013.01);
(Continued)

(58) Field of Classification Search
CPC .............. H04B 10/118; H04B 7/18539; H04B 7/18517; H04B 7/18515; H04B 7/2041; H04J 14/02
(Continued)

(56) References Cited

U.S. PATENT DOCUMENTS

| 4,567,591 A * | 1/1986 | Gray ..................... H03M 13/05 370/326 |
| 4,660,196 A * | 4/1987 | Gray ..................... H03M 13/05 370/326 |

(Continued)

OTHER PUBLICATIONS

Notice of Allowance dated May 16, 2018, in U.S. Appl. No. 15/394,512, filed Dec. 29, 2016.
(Continued)

*Primary Examiner* — Kenneth N Vanderpuye
*Assistant Examiner* — Dibson J Sanchez
(74) *Attorney, Agent, or Firm* — Vierra Magen Marcus LLP

(57) ABSTRACT

Described herein are ground based subsystems, and related methods, for use in transmitting an optical feeder uplink beam to a satellite that is configured to receive the optical feeder uplink beam and in dependence thereon produce and transmit a plurality of RF service downlink beams within a specified RF frequency range to service terminals. Certain embodiments are related to a resource allocator for inclusion in a ground based subsystem, and methods for use therewith. Beneficially, the resource allocator, and methods for use therewith, eliminate any need for a satellite to perform any bandwidth allocation for the plurality of service downlink beams produced and transmitted by the satellite, thereby eliminating any need for the satellite to include an on-board channelizer. Such a recourse allocator can include a plurality of channels each of which can include an encoder and modulator, a channel filter, and a frequency up-converter.

19 Claims, 9 Drawing Sheets

(51) Int. Cl.
*H04J 14/02* (2006.01)
*H04B 7/204* (2006.01)

(52) U.S. Cl.
CPC .......... *H04B 7/18539* (2013.01); *H04J 14/02* (2013.01); *H04B 7/2041* (2013.01)

(58) Field of Classification Search
USPC .................................................. 398/118–131
See application file for complete search history.

(56) References Cited

U.S. PATENT DOCUMENTS

| | | | | |
|---|---|---|---|---|
| 5,734,962 | A * | 3/1998 | Hladik | H03M 13/2996 370/342 |
| 5,966,371 | A | 10/1999 | Sherman | |
| 6,055,015 | A * | 4/2000 | Edwards | H04N 17/004 348/192 |
| 6,181,450 | B1 * | 1/2001 | Dishman | H04B 7/18521 370/281 |
| 6,317,583 | B1 | 11/2001 | Wolcott et al. | |
| 6,879,640 | B1 * | 4/2005 | Agazzi | H04B 10/2575 375/295 |
| 7,327,779 | B1 * | 2/2008 | Lugil | H04B 1/707 375/141 |
| 8,135,338 | B1 | 3/2012 | Gelon et al. | |
| 9,294,225 | B2 * | 3/2016 | Eliaz | H04L 27/2628 |
| 9,614,554 | B2 * | 4/2017 | Beidas | H04L 25/03343 |
| 2003/0108280 | A1 * | 6/2003 | Puzey | H04B 10/505 385/24 |
| 2005/0100339 | A1 | 5/2005 | Tegge, Jr. | |
| 2005/0169395 | A1 * | 8/2005 | Monta | H04L 27/2628 375/261 |
| 2005/0238116 | A1 * | 10/2005 | Monta | H04L 5/06 375/298 |
| 2005/0249501 | A1 * | 11/2005 | Wolcott | H04B 10/1127 398/118 |
| 2006/0290819 | A1 * | 12/2006 | Benjebbour | H04B 1/1036 348/678 |
| 2009/0016411 | A1 * | 1/2009 | McCallister | H04L 5/0017 375/146 |
| 2009/0110133 | A1 * | 4/2009 | Suh | H04L 27/04 375/354 |
| 2009/0202254 | A1 | 8/2009 | Majumdar et al. | |
| 2011/0103507 | A1 * | 5/2011 | Beidas | H04L 27/0008 375/285 |
| 2011/0188550 | A1 * | 8/2011 | Wajcer | H04L 25/03343 375/214 |
| 2012/0094593 | A1 * | 4/2012 | Burr | H04B 7/18515 455/12.1 |
| 2012/0328298 | A1 | 12/2012 | Yi et al. | |
| 2014/0079160 | A1 * | 3/2014 | Beidas | H04L 27/38 375/341 |
| 2014/0092804 | A1 | 4/2014 | Scott | |
| 2014/0119385 | A1 | 5/2014 | Hoffmeyer et al. | |
| 2015/0381392 | A1 * | 12/2015 | Beidas | H04L 25/03286 375/308 |
| 2017/0041065 | A1 | 2/2017 | Goethe, Jr. et al. | |
| 2017/0214462 | A1 | 7/2017 | Busche et al. | |
| 2017/0366262 | A1 | 12/2017 | Turgeon et al. | |
| 2017/0366263 | A1 | 12/2017 | Turgeon et al. | |

OTHER PUBLICATIONS

Office Action dated Dec. 14, 2017, in U.S. Appl. No. 15/394,512, filed Dec. 29, 2016.
Amendment dated Jan. 5, 2018, in U.S. Appl. No. 15/394,512, filed Dec. 29, 2016.
Mato-Calvo et al, "Optical Feeder Links for Very High Throughput Satellites—System Perspectives", Proceedings of the Ka and Broadband Communications, Navigation and Earth Observation Conference 2015, Ka Conference 2015, Oct. 2-14, 2015, Bologna, Italy.

* cited by examiner

US 10,320,481 B2

FLEXIBLE HIGH THROUGHPUT SATELLITE SYSTEM USING OPTICAL GATEWAYS

PRIORITY CLAIM

This application claims priority to U.S. Provisional Patent Application No. 62/362,010, filed Jul. 13, 2016, which is incorporated herein by reference in its entirety.

BACKGROUND

There is increasing need for large amounts of bandwidth to be routed between a ground based gateway and a spaced based satellite. With the recent announcement of planned Ka band and Ku band satellite constellations, it would be beneficial if such frequency band satellite constellations can be used to help satisfy the aforementioned increasing need for large amounts of bandwidth to be routed between a ground based gateway and a spaced based satellite.

DETAILED DESCRIPTION

Certain embodiments of the present technology described herein relate to system and sub-system architectures for high throughput satellites (HTS), very high throughput satellites (VHTS) and very very high throughput satellites (VVHTS), which is also known as ultra high throughput satellites (UHTS), all of which can be collectively referred to as HTS. Because of spectrum availability, if feeder links between gateway (GW) sites and satellites are at optical frequencies, then the number of GW sites can be drastically reduced compared to if the feeder links are at RF frequencies, which leads to significant cost savings in the space and ground segments. Even with the availability of 5 GHz spectrum at V band and dual polarization, a satellite with Terabit/sec (Tb/s) capacity would need between 40 and 70 GWs using RF feeder links, depending on the spectral efficiency achieved, as described in a conference paper titled "Optical Feederlinks for VHTS—System Perspectives", by Mata-Calvo et al. (Conference: Proceedings of the Ka and Broadband Communications, Navigation and Earth Observation Conference 2015. Ka Conference 2015, 12-14 Oct. 2015, Bologna, Italy). In contrast, using optical feeder links can reduce the total active GW count to one (plus a few sites would be added for diversity and redundancy; but note that V/Q band or Ka band GWs typically also need diversity and redundancy sites to achieve high availability).

Prior to describing details of specific embodiments of the present technology, it is first useful to describe an exemplary wireless communication system with which embodiments of the present technology would be useful. An example of such a wireless communication system will now be described with reference to FIG. 1.

Figure 1:
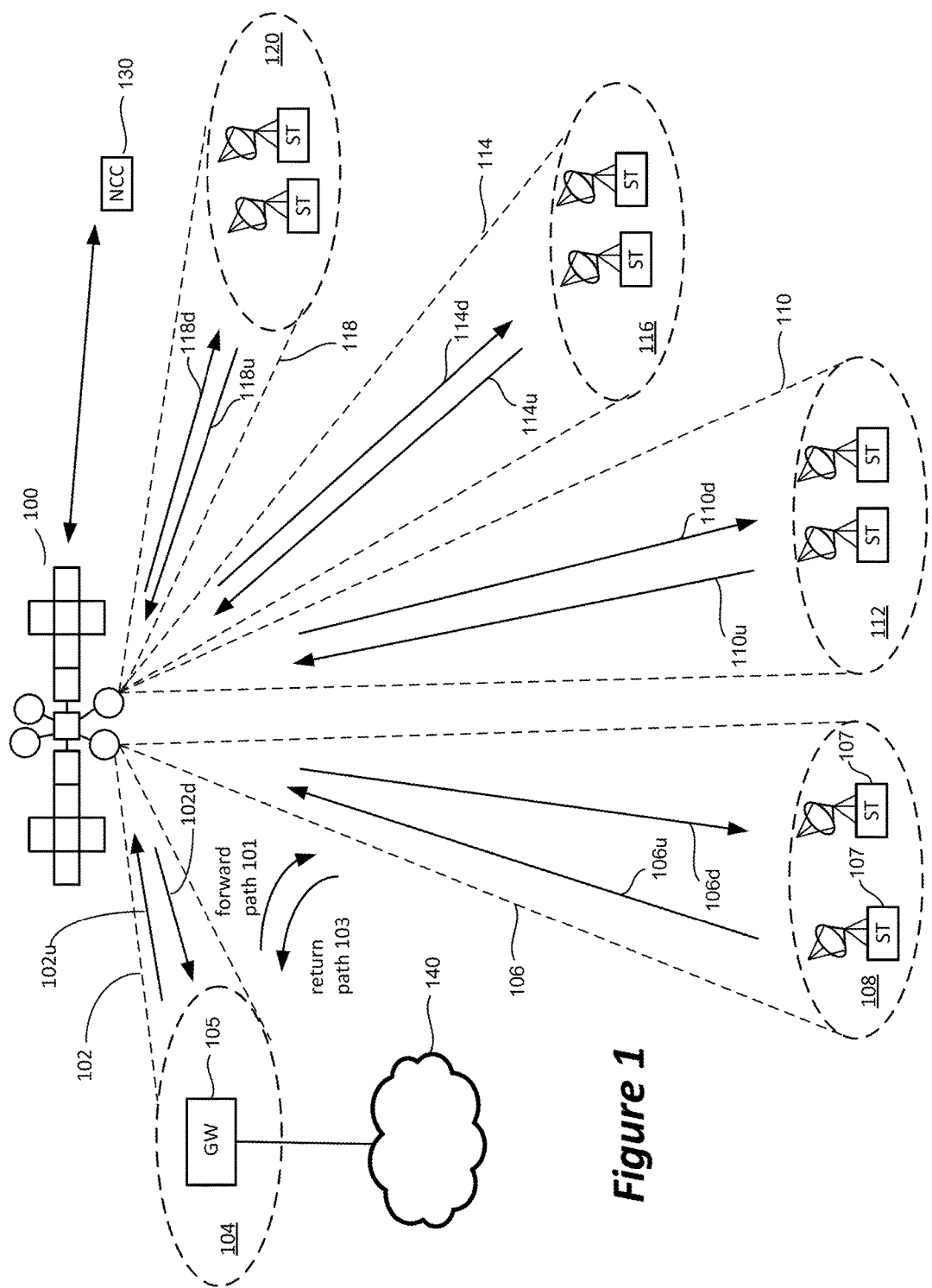
FIG. 1 is a block diagram describing a wireless communication system, which may be a satellite communication system.

FIG. 1 depicts a block diagram of a wireless communications system that includes a communication platform 100, which may be a satellite located, for example, at a geostationary or non-geostationary orbital location. In other embodiments, other platforms may be used such as an unmanned aerial vehicle (UAV) or balloon, or even a ship for submerged subscribers. In yet another embodiment, the subscribers may be air vehicles and the platform may be a ship or a truck where the "uplink" and "downlink" in the following paragraphs are reversed in geometric relations. Platform 100 may be communicatively coupled to at least one gateway (GW) 105 and a plurality of subscriber terminals ST (including subscriber terminals 107). The term subscriber terminals may be used to refer to a single subscriber terminal or multiple subscriber terminals. A subscriber terminal ST is adapted for communication with the wireless communication platform 100, which as noted above, may be a satellite. Subscriber terminals may include fixed and mobile subscriber terminals including, but not limited to, a cellular telephone, a wireless handset, a wireless modem, a data transceiver, a paging or position determination receiver, or mobile radio-telephone, or a headend of an isolated local network. A subscriber terminal may be handheld, portable (including vehicle-mounted installations for cars, trucks, boats, trains, planes, etc.) or fixed as desired. A subscriber terminal may be referred to as a wireless communication device, a mobile station, a mobile wireless unit, a user, a subscriber, or a mobile. Where the communication platform of a wireless communication system is a satellite, the wireless communication system can be referred to more specifically as a satellite communication system. For the remainder of this description, unless stated otherwise, it is assumed that the communication platform 100 is a satellite. Accordingly, platform 100 will often be referred to as satellite 100, and the wireless communication system will often be referred to as a satellite communication system.

In one embodiment, satellite 100 comprises a bus (e.g., spacecraft) and one or more payloads (e.g., the communication payload). The satellite will also include multiple power sources, such as batteries, solar panels, and one or more propulsion systems, for operating the bus and the payload.

The at least one gateway 105 may be coupled to a network 140 such as, for example, the Internet, terrestrial public switched telephone network, mobile telephone network, or a private server network, etc. Gateway 105 and the satellite (or platform) 100 communicate over a feeder beam 102, which has both a feeder uplink 102u and a feeder downlink 102d. In one embodiment, feeder beam 102 is a spot beam to illuminate a region 104 on the Earth's surface (or another surface). Gateway 105 is located in region 104 and communicates with satellite 100 via feeder beam 102. Although a single gateway is shown, some implementations will include many gateways, such as five, ten, or more. One embodiment includes only one gateway. Each gateway may utilize its own feeder beam, although more than one gateway can be positioned within a feeder beam. In one embodiment, a gateway is located in the same spot beam as one or more subscriber terminals.

Subscriber terminals ST and satellite 100 communicate over service beams, which are also known as user beams. For example, FIG. 1 shows service beams 106, 110, 114 and 118 for illuminating regions 108, 112, 116 and 120, respectively. In many embodiments, the communication system will include more than four service beams (e.g., sixty, one hundred, etc.). Each of the service beams have an uplink (106*u*, 110*u*, 114*u*, 118*u*) and a downlink (106*d*, 110*d*, 114*d*, 118*d*) for communication between subscriber terminals ST and satellite 100. Although FIG. 1 only shows two subscriber terminals within each region 108, 112, 116 and 120, a typical system may have thousands of subscriber terminals within each region.

In one embodiment, communication within the system of FIG. 1 follows a nominal roundtrip direction whereby data is received by gateway 105 from network 140 (e.g., the Internet) and transmitted over the forward path 101 to a set of subscriber terminals ST. In one example, communication over the forward path 101 comprises transmitting the data from gateway 105 to satellite 100 via uplink 102*u* of feeder beam 102, through a first signal path on satellite 100, and from satellite 100 to one or more subscriber terminals ST via downlink 106*d* of service beam 106. An uplink (e.g., 102*u*) of a feeder beam (e.g., 102) can also be referred to more succinctly as a feeder uplink beam, and the downlink (e.g., 106*d*) of a service beam (e.g., a 106) can also be referred to more succinctly as a service downlink beam. Although the above example mentions service beam 106, the example could have used other service beams.

Data can also be sent from the subscriber terminals STs over the return path 103 to gateway 105. In one example, communication over the return path comprises transmitting the data from a subscriber terminal (e.g., subscriber terminal 107 in service beam 106) to satellite 100 via uplink 106*u* of service beam 106, through a second signal path on satellite 100, and from satellite 100 to gateway 105 via downlink 102*d* of feeder beam 102. An uplink (e.g., 106*u*) of a service beam (e.g., 106) can also be referred to more succinctly as a service uplink beam, and the downlink 102*d* of feeder beam 102 can also be referred to more succinctly as a feeder downlink beam. Although the above example uses service beam 106, the example could have used any service beam.

FIG. 1 also shows a Network Control Center (NCC) 130, which can include an antenna and modem for communicating with satellite 100, as well as one or more processors and data storage units. Network Control Center 130 provides commands to control and operate satellite 100. Network Control Center 130 may also provide commands to any of the gateways and/or sub scriber terminals.

In one embodiment, communication platform 100 implements the technology described below. In other embodiments, the technology described below is implemented on a different platform (or different type of satellite) in a different communication system. For examples, the communication platform can alternatively be a UAV or balloon, but is not limited thereto.

The architecture of FIG. 1 is provided by way of example and not limitation. Embodiments of the disclosed technology may be practiced using numerous alternative implementations.

Conventionally, a gateway (e.g., gateway 105) communicates with a satellite (e.g., satellite 100) using an antenna on the ground that transmits and receives RF (radiofrequency) signals to and from an antenna on the satellite. Certain embodiments of the present technology utilize optical components instead of antennas to transmit and receive optical signals between a gateway and a satellite, as will be described in additional details below.

Certain embodiments of the present technology involve the use of analog-over free-space optical signals, which leads to an elegant architecture for a satellite repeater, whereby all frequency down-conversion in the forward link is eliminated. An advantage of this approach, especially for HTS satellites, is that it eliminates the need for very high speed Analog-to-Digital Converters (ADCs) and Digital to Analog Converters (DACs) on the satellites. Further, this approach allows the aggregation of multiple user links but does not require extra hardware associated with an onboard demodulator and remodulator, and thus reduces the mass, power and cost of the satellite, perhaps making the difference between being able to launch or not being able to launch the satellite. In addition, in accordance with specific embodiments where the uplink and downlink communication signals are modulated at transmit (forward) and receive (return) RF frequencies, no frequency conversion in the forward link is required on the satellite, thereby further simplifying the payload design. By contrast, previously envisioned free-space optical spacecraft architectures proposed demodulation of the optical signal, followed by routing to user link pathways and remodulation of the signal on user link RF frequencies. Further, certain embodiments of the present technology eliminate the need for a satellite to include an onboard channelizer, as will be described in additional detail below.

Block diagrams for the communications subsystems for the ground and space segments, according to certain embodiments of the present technology, are described below with reference to FIGS. 2A, 2B, 3, 4A, 4B and 5. Certain embodiments use analog modulation and demodulation on the satellite, thus enabling optical feeder links without onboard processing.

Figure 2A:
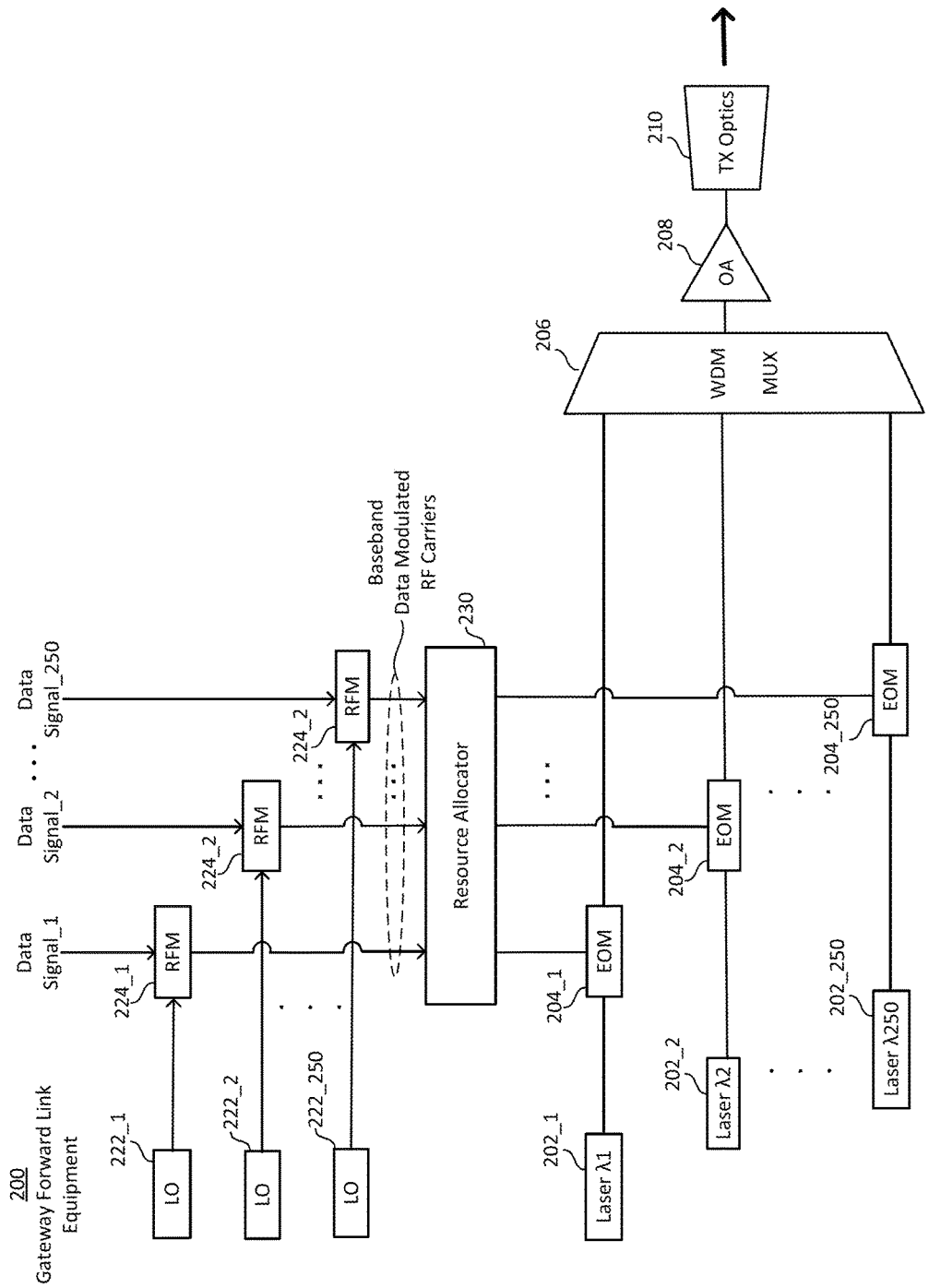
FIG. 2A depicts gateway forward link equipment, according to an embodiment of the present technology.
Figure 2B:
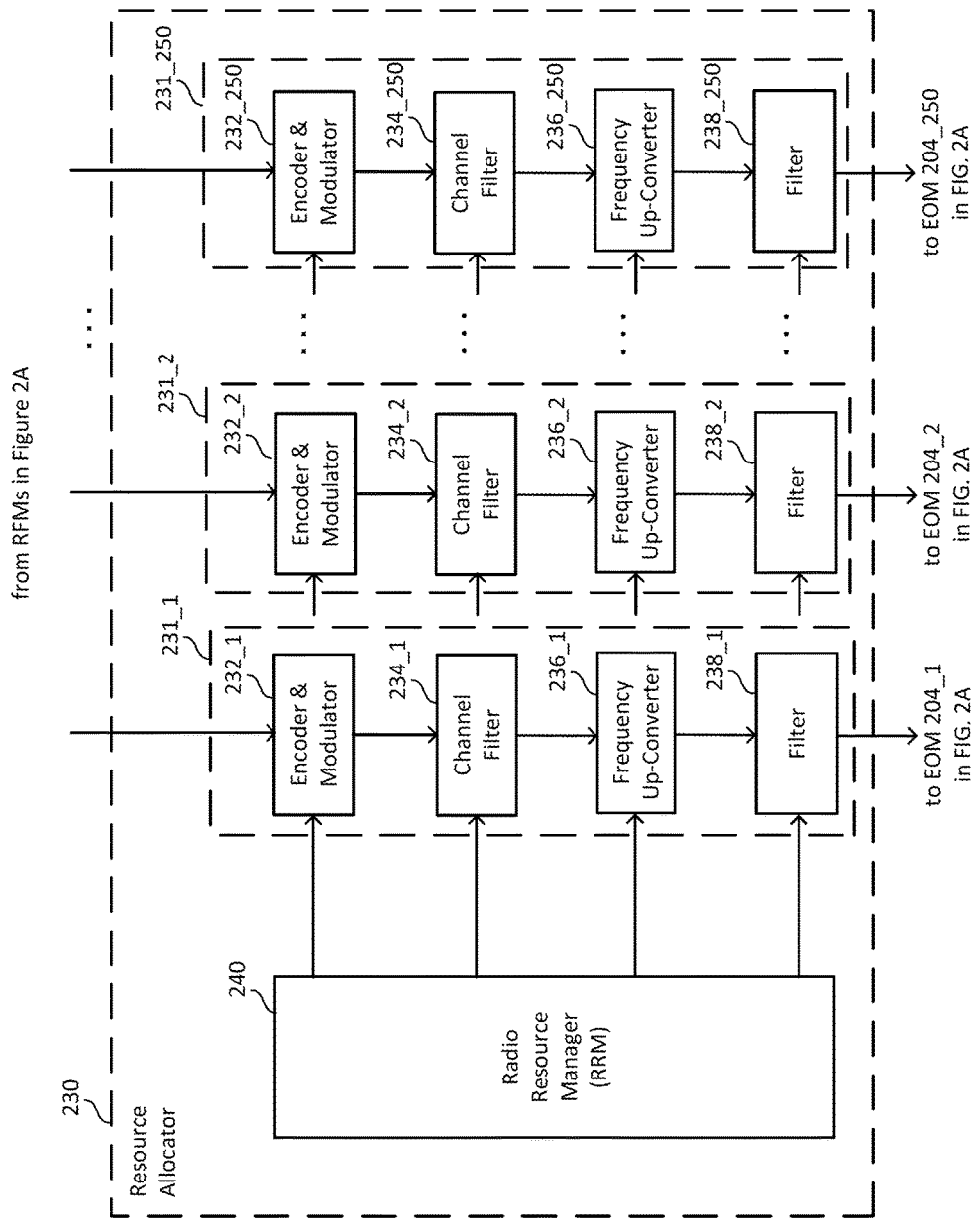
FIG. 2B depicts components of the resource allocator introduced in FIG. 2A, according to an embodiment of the present technology.
Figure 3:
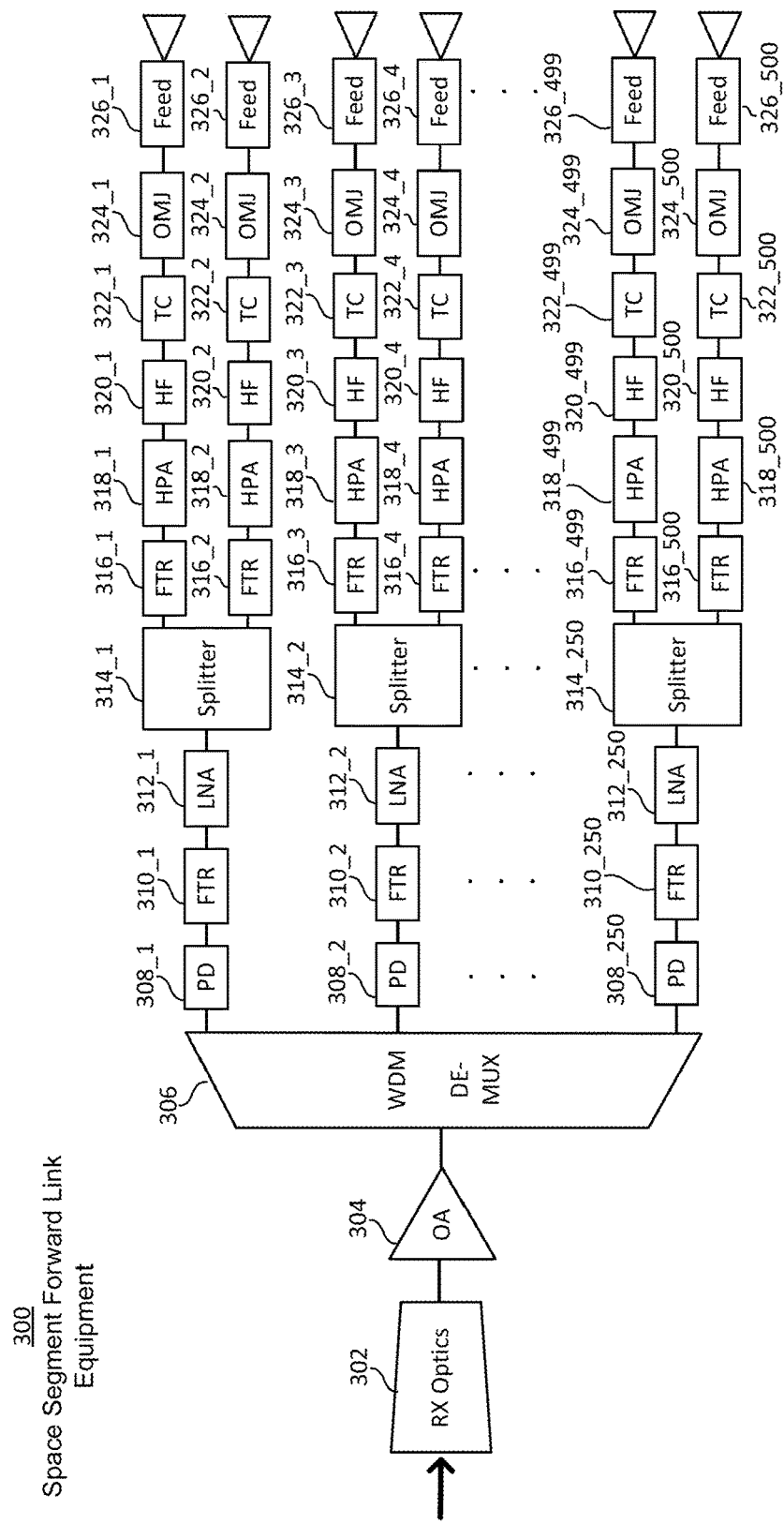
FIG. 3 depicts space segment forward link equipment, according to an embodiment of the present technology.
Figure 4A:
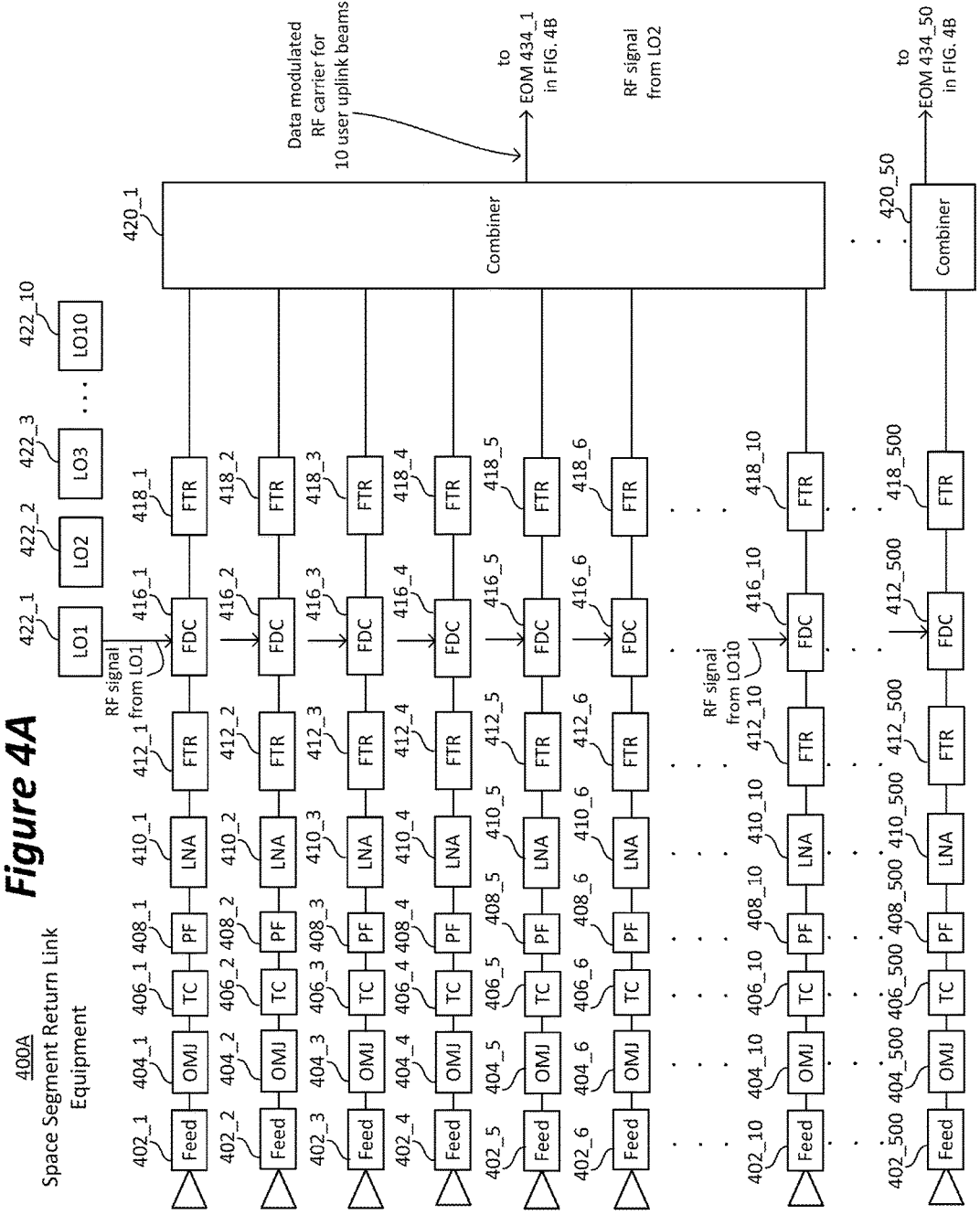
FIG. 4A depicts a portion of space segment return link equipment, according to alternative embodiments of the present technology.
Figure 4B:
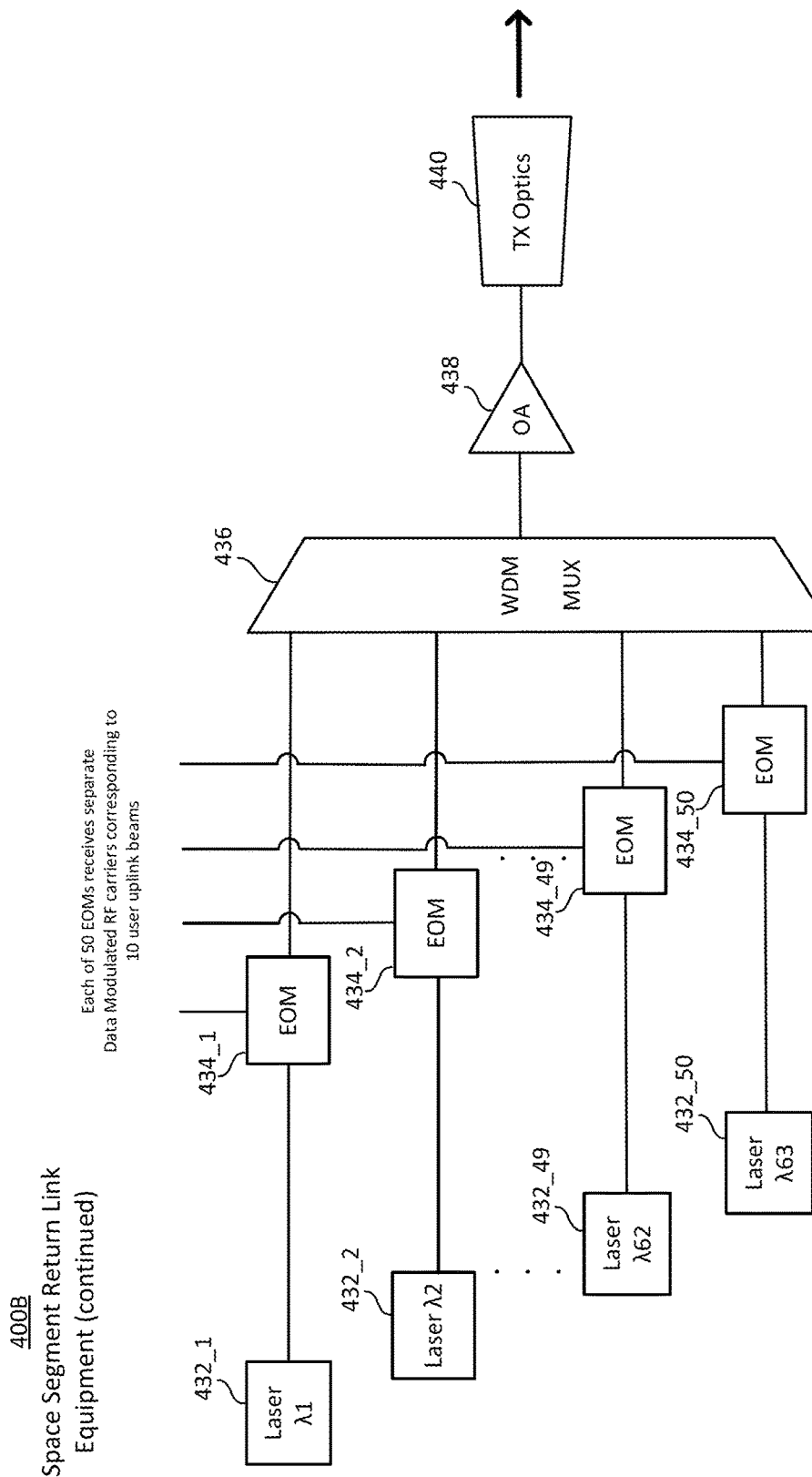
FIG. 4B depicts a further portion of space segment return link equipment, according to an embodiment of the present technology.
Figure 5:
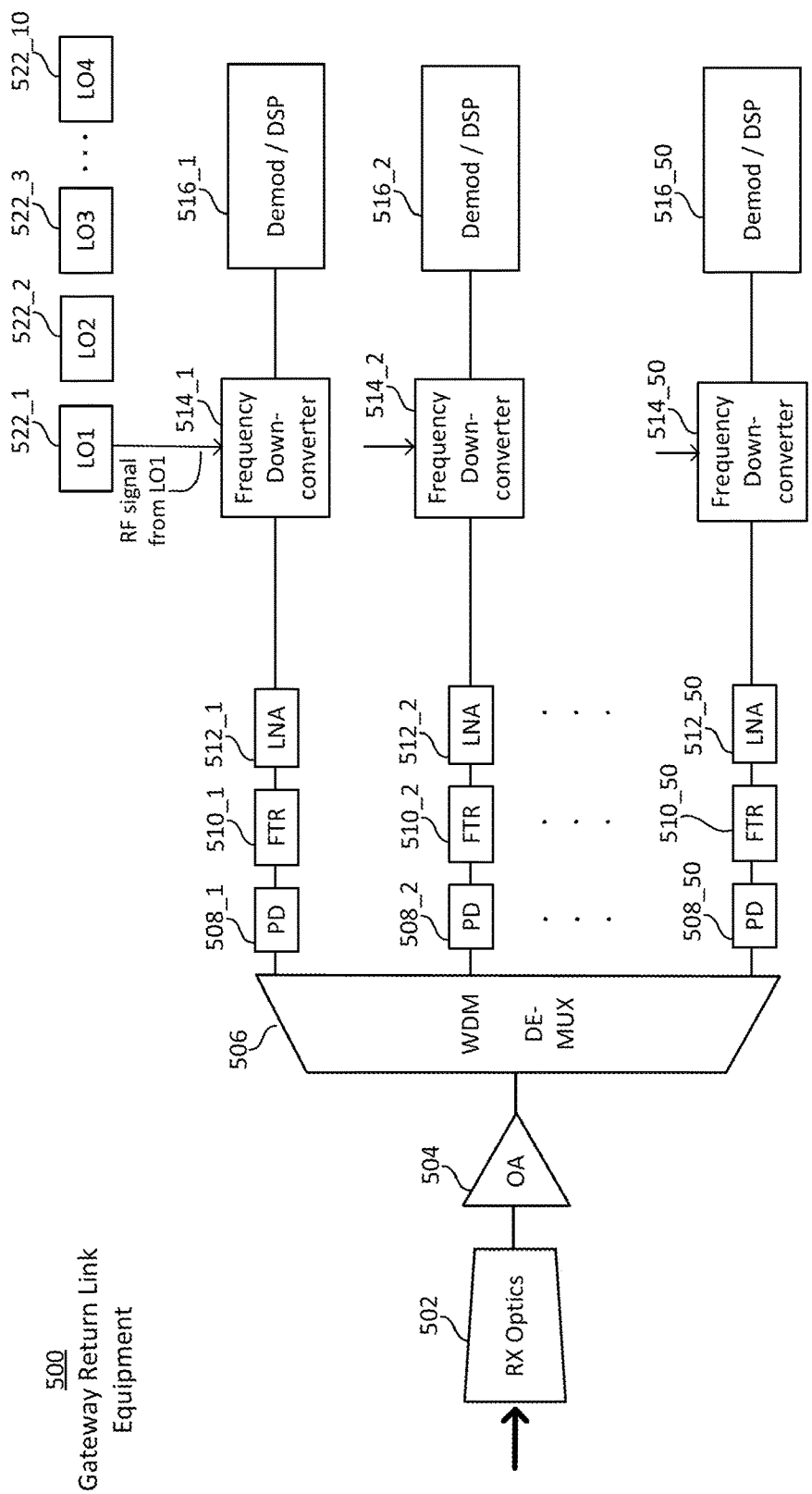
FIG. 5 depicts gateway return link equipment, according to an embodiment of the present technology.

FIGS. 2A and 2B will first be used to describe gateway forward link equipment according to certain embodiments of the present technology. FIG. 3 will then be used to describe space segment forward link equipment according to an embodiment of the present technology. In specific embodiments, 250 laser wavelengths are combined at a single gateway (which can be referred to as an optical gateway) and sent to the satellite, which has multiple (e.g., 250 or 500) user beams (also known as service beams) operating at Ka band frequencies. In accordance with an embodiment, each wavelength carries 2.5 GHz so that a total of 625 GHz is sent from the gateway on the ground to the satellite. At a modest spectral efficiency of 2 bps/Hz, this leads to a 1.25 Tb/s satellite design. In accordance with another embodiment, each wavelength carries 2.9 GHz so that a total of 725 GHz is sent from the gateway on the ground to the satellite. At a modest spectral efficiency of 2 bps/Hz, this leads to a 1.45 Tb/s satellite design. FIGS. 4A, 4B and 5 will thereafter be used to depict return link equipment for a satellite and a gateway.

Gateway Forward Link Equipment

FIG. 2A will now be used to describe gateway forward link equipment 200, according to an embodiment of the present technology. Such gateway forward link equipment 200 can also be referred to as an optical gateway forward link subsystem 200, or more generally, as an optical communication subsystem. Referring to FIG. 2A, the optical gateway forward link subsystem 200 is shown as including two hundred and fifty lasers 202_1 to 202_250, two hundred and fifty electro-optical modulator (EOMs) 204_1 to 204_250, a wavelength-division multiplexing (WDM) multiplexer (MUX) 206, an optical amplifier (OA) 208 and transmitter optics 210. The optical gateway forward link subsystem 200 is also shown as including two hundred and fifty local oscillators (LOs) 222_1 to 222_250, two hundred and fifty radio frequency modulators (RFMs) 224_1 to 224_250, and a resource allocator 230. Each of these elements are described below.

The forward link equipment is shown as producing a collimated optical feeder uplink beam that is aimed at a satellite, in dependence on two hundred and fifty data signals labeled data signal_1, data signal_2 ... data signal_250. Each of the data signals is shown as being provided to a respective one of the two hundred and fifty radio frequency modulators (RFMs) 224_1 to 224_250, which can be referred to collectively as RFMs 224, or individually as an RFM 224. The local oscillators (LOs) 222_1 to 222_250, which can be referred to collectively as LOs 222, or individually as an LO 222, provide RF carrier signals to the RFMs 224_1 to 224_250. Each of the RFMs 224 receives both an RF carrier signal from an LO 222, and a data signal. For example, the RFM 224_1 is shown as receiving an RF carrier signal from the LO 222_1 and a data signal_1, and the RFM 224_2 is shown as receiving an RF carrier signal from the LO 222_2 and a data signal_2. Each RFM 224 modulates the data signal it receives onto the RF carrier signal it receives (from an LO 222) to produce a data modulated RF carrier signal, which is provided to the resource allocator 230. In accordance with certain embodiments, the RF carrier signals produced by the LOs 222 have an RF frequency within an intermediate RF frequency range (e.g., from 1.5 GHz to 2.0 GHz) within which the resource allocator 230 is configured to perform encoding and modulation. Higher or lower intermediate RF frequency ranges can also be used, depending upon implementation. As will be described in additional detail below, with reference to FIG. 2B, in accordance with certain embodiments, after encoding and modulating a data modulated RF carrier signal and performing channel filtering on the signal, the resource allocator 230 will frequency-up-convert data modulator RF carrier signals before they are provided to a respective one of the EOMs 204_1 to 204_250. The EOMs can be referred to individually as an EOM 204, or collectively as the EOMs 204.

Still referring to FIG. 2A, the two hundred and fifty separate lasers 202_1 to 202_250 each emit light of a different wavelength within a specified wavelength range that is for use in producing the optical feeder uplink beam (e.g., 102u). The lasers can be referred to individually as a laser 202, or collectively as the lasers 202. Where the specified wavelength range is, for example, from 1510 nanometers (nm) to 1560 nm, then the laser 202_1 may emit light having a peak wavelength of 1510 nm, the laser 202_2 may emit light having a peak wavelength of 1510.2 nm, the laser 202_3 (not shown) may emit light having a peak wavelength of 1510.4 nm, ... the laser 202_249 (not shown) may emit light having a peak wavelength of 1559.8 nm, and the laser 202_250 may emit light having a peak wavelength of 1560 nm. In other words, the peak wavelengths emitted by the lasers 202 can occur at 0.2 nm intervals from 1510 nm to 1560 nm. The wavelength range from 1510 nm to 1560 nm, which is within the infrared (IR) spectrum, is practical to use because IR lasers for use in communications are readily available. However, wider or narrow wavelength ranges, within the same or other parts of the optical spectrum, may alternatively be used. For example, it would also be possible to utilize a wavelength range within the 400 nm-700 nm visible spectrum. It is also possible that the wavelength range that is specified for use in producing the optical feeder uplink beam (e.g., 102u) is non-contiguous. For example, the wavelength range that is for use in producing the optical feeder uplink beam can be from 1510 nm to 1534.8 nm and from 1540.2 nm to 1564.8 nm. Further, it is also possible that gateway forward link equipment can alternatively include more or less than two hundred and fifty lasers (that each emit light of a different peak wavelength within a specified contiguous or non-contiguous wavelength range). Additionally, it is noted that the gateway forward link equipment may include two or more of each of the lasers (that each emit light of a different peak wavelength within a specified contiguous or non-contiguous wavelength range) to provide for redundancy or backup. Each of the lasers 202 can be, for example, a diode-pumped infrared neodymium laser, although the use of other types of lasers are also within the scope of the embodiments described herein.

To reduce and preferably avoid interference, the wavelength range that is for use in producing the optical feeder uplink beam (e.g., 102u) should be different than the wavelength range that is for use in producing the optical feeder downlink beam (e.g., 102d). For example, if the wavelength range that is for use in producing the optical feeder uplink beam 102u is from 1510 nm to 1560 nm, then the wavelength range that is for use in producing the optical feeder downlink beam 102d can be from 1560.2 nm to 1575 nm. For another example, if the wavelength range that is for use in producing the optical feeder uplink beam 102u is from 1510 nm to 1534.8 nm and from 1540.2 nm to 1564.8 nm, then the wavelength range that is for use in producing the optical feeder downlink beam 102d can be from 1535 nm to 1540 nm and from 1565 nm to 1575 nm. These are just a few examples, which are not intended to be all encompassing. Details of how an optical feeder downlink beam (e.g., 102d) can be produced in accordance with an embodiment of the present technology are provided below in the discussion of FIGS. 4A and 4B.

Still referring to FIG. 2A, the light emitted by each of the two hundred and fifty lasers 202, which can be referred to as an optical carrier signal, is provided (e.g., via a respective optical fiber) to a respective one of the two hundred and fifty separate EOMs 204_1 to 204_250. Each of the EOMs is an optical device in which a signal-controlled element exhibiting an electro-optic effect is used to modulate a respective beam of light. The modulation performed by the EOMs 204 may be imposed on the phase, frequency, amplitude, or polarization of a beam of light, or any combination thereof. In accordance with a specific embodiment, each of the EOMs 204 is a phase modulating EOM that is used as an amplitude modulator by using a Mach-Zehnder interferometer. In other words, each of the EOMs 204 can be implemented as a Mach-Zehnder modulator (MZM), which can be a Lithium Niobate Mach-Zehnder modulator, but is not limited thereto. In accordance with specific embodiments, each of the EOMs 204 is implemented as an MZM that produces an amplitude modulated (AM) optical waveform with a modulation index between 10% and 80% in order to maintain fidelity of an RF waveform (modulated therein) without too much distortion. The optical signal that is output by each of the EOMs 204 can be referred to as an optical data signal. The modulation scheme that is implemented by the EOMs 204 can result in double- or vestigial-sidebands, including both an upper sideband (USB) and a lower sideband (LSB). Alternatively single-sideband modulation (SSB) can be utilized to increase bandwidth and transmission power efficiency.

The two hundred and fifty separate optical data signals that are output by the two hundred and fifty EOMs 204 are provided to the WDM MUX 206, which can also be referred to as a dense wavelength division multiplexing (DWDM) MUX. The WMD MUX 206 multiplexes (i.e., combines) the two hundred and fifty optical data signals, received from the two hundred and fifty EOMs 204, onto a single optical fiber, with each of the two hundred and fifty separate optical data signals being carried at the same time on its own separate optical wavelength within the range from 1510 nm to 1560 nm (or some other contiguous or non-contiguous wavelength range). For example, as explained above, the two hundred and fifty separate optical data signals can have peak wavelengths of 1510 nm, 1510.2 nm, 1510.4 nm . . . 1559.8 nm and 1560 nm.

The signal that is output by the WMD MUX 206, which can be referred to as a wavelength division multiplexed optical signal, is provided to the optical amplifier (OA) 208. The OA 208 amplifies the wavelength division multiplexed optical signal so that the wavelength division multiplexed optical signal has sufficient power to enable transmission thereof from the ground to the satellite 100 in space. An exemplary type of OA 208 that can be used is an erbium-doped fiber amplifier (EDFA). However embodiments of the present technology are not limited to use with an EDFA. The output of the OA 208 can be referred to as an optically amplified wavelength division multiplexed optical signal.

The optically amplified wavelength division multiplexed optical signal, which is output by the OA 208, is provided (e.g., via an optical fiber) to the transmitter optics 210. The transmitter optics 210, which can also be referred to as a telescope, can includes optical elements such as lenses, mirrors, reflectors, filters and/or the like. The transmitter optics 210 outputs a collimated optical feeder uplink beam that is aimed at a satellite. A gimbal, and/or the like, can be used to control the steering of the transmitter optics 210. In accordance with an embodiment, the collimated optical feeder uplink beam has an aperture of about 100 cm, and a half beam divergence of about 0.0000004 radians, wherein the term "about" as used herein means +/−10 percent of a specified value. The use of other apertures and half beam divergence values are also within the scope of the embodiments described herein. The collimated optical feeder uplink beam, which is output by the transmitter optics 210, is transmitted in free-space to receiver optics on a satellite. The term "free-space" means air, outer space, vacuum, or something similar (which is in contrast to using solids such as optical fiber cable, an optical waveguide or an optical transmission line). Reception and processing of the optical feeder uplink beam received at the satellite will be described in additional detail below. However, before describing the reception and processing of the optical feeder uplink beam received at the satellite, additional details of the gateway forward link equipment, according to certain embodiments of the present technology, will first be provided.

Referring again to the EOMs 204, in accordance with certain embodiments of the present technology, each of the EOMs 204 modulates the optical signal it receives (e.g., via an optical fiber from a respective laser 202) with a separate RF signal that has already been modulated to include the user data included in the data signal_1, data signal_2 . . . data signal_250. In accordance with certain embodiments, in order to eliminate the need for RF frequency down-converters in the forward link equipment onboard the satellite, the carrier frequencies of the RF signals that are used to modulate each of the two hundred and fifty lasers 202 on the ground (e.g., in gateway 105) correspond to the desired user downlink frequency band within the Ka band (or some other allotted band). As a result, the satellite repeater is greatly simplified.

For example, a portion of the Ka band that may be desirable to use for transmitting service downlink beams (also referred to as downlink user beams) from satellite 100 to service terminals ST can be from 17.7-20.2 GHz, and thus, includes a 2.5 GHz bandwidth. In such a case, each of the EOMs 204 could modulate the optical signal it receives (e.g., via an optical fiber from a respective laser 202) with a separate RF signal having a frequency within the range from 17.7-20.2 GHz. Further, since each of the two hundred and fifty optical data signals (produced by the two hundred and fifty EOMs) has a bandwidth of 2.5 GHz, the bandwidth of the optical feeder uplink beam that is sent from the ground to the satellite is 625 GHz (i.e., 2.5 GHz*250=625 GHz).

For another example, a portion of the Ka band that may be desirable to use for transmitting service downlink beams (also referred to as downlink user beams) from satellite 100 to service terminals ST can be from 17.3-20.2 GHz, and thus, includes a 2.9 GHz bandwidth. In such a case, each of the EOMs 204 could modulate the optical signal it receives (e.g., via an optical fiber from a respective laser 202) with a separate RF signal having a frequency within the range from 17.3-20.2 GHz. Further, since each of the two hundred and fifty optical data signals (produced by the two hundred and fifty EOMs) has a bandwidth of 2.9 GHz, the bandwidth of the optical feeder uplink beam that is sent from the ground to the satellite is 725 GHz (i.e., 2.9 GHz*250=725 GHz).

Where there is a desire or requirement that satellite 100 transmits five hundred separate service downlink beams, then the portion of the optical feeder uplink beam that is produced by each of the two hundred and fifty lasers 202 can be modulated to carry the data for two of the five hundred service downlink beams. In other words, each of the optical signals produced by each of the two hundred and fifty lasers 202 can be modulated to carry the data for two of the five hundred service downlink beams. This can be achieved by using half of the available portion of the Ka band for carrying the data for one service downlink beam, and the other half of the available portion of the Ka band for carrying the data for another service downlink beam. For example, where the portion of the Ka band that is available for transmitting service downlink beams (also referred to as downlink user beams) is from 17.7-20.2 GHz, then 17.7-18.95 GHz can be used for carrying the data for one service downlink beam, and 18.95-20.2 GHz can be used for carrying the data for another service downlink beam. For another example, where the portion of the Ka band that is available for transmitting service downlink beams (also referred to as user downlink beams) is from 17.3-20.2 GHz, then 17.3-18.75 GHz can be used for carrying the data for one service downlink beam, and 18.75-20.2 GHz can be used for carrying the data for another service downlink beam.

Still referring to FIG. 2A, the RFMs 224 can perform various different types of RF modulation, depending upon implementation and other factors such channel conditions. For example, the RFMs 224 can perform Amplitude-shift keying (ASK), Phase-shift keying (PSK), or Amplitude and phase-shift keying (APSK) types of modulation (e.g., 16-, 128- or 256-APSK), just to name a few In order to wavelength division multiplex two hundred and fifty wavelengths produced by the two hundred and fifty lasers 202_1 to 202_250, a combination of C band optical frequencies (from 1530 nm to 1565 nm) and L band optical frequencies (from 1565 nm to 1625 nm) may be used, in order to keep the separation of the wavelengths to be at least 20-25 GHz in order to reduce and preferably minimize inter-wavelength interference that may occur in an optical fiber due to non-linearities. If fewer wavelengths are used (e.g., at C band alone), and higher bandwidth is available at Ka band per user beam (e.g., if 2.9 GHz is available as it is in certain ITU Regions), the overall throughput still remains of the order of several hundred GHz, which lets the capacity reach the Tb/s range. If instead each wavelength carries more than the Ka band user bandwidth, fewer wavelengths can be used, but some amount of frequency conversion may be needed in the space segment forward link equipment.

Conventional an HTS payload achieves flexibility by using a digital channelizer on board a satellite, which acts as a router to dynamically route chunks of RF gateway bandwidth to different service downlink beams based on demand per service downlink beam. However, a digital channelizer requires extensive digital processing capabilities. Additionally, with a digital channelizer, the more bandwidth to be routed, the more power consumption and mass there will be. Further, a digital channelizer has finite routing granularity because the digital filters therein have a finite minimum bandwidth. In other words, because digital processing power scales with total bandwidth to be routed and granularity, the more bandwidth and finer granularity, the more power and mass required for the channelizer. For example, for a small HTS system with 40 GHz total routable bandwidth, the total power consumption can reach about 2 kW, and the total mass could reach about 300 kg. For a large VHTS system with over 500 GHz routable bandwidth, a digital channelizer would likely become too large to be accommodated onboard a satellite. Another drawback of including a digital channelizer onboard a satellite is the sophistication of the repeater to accommodate the digital channelizer. For example, many intermediate frequency (IF) converters and anti-aliasing filters would be needed to accommodate the sampling frequencies and eliminate ghost images. Another drawback is the cost associated with a digital channelizer, which is typically very high because they typically require custom application specific integrated circuit (ASIC) design and field-programmable gate array (FPGA) capability. Additionally, a digital channelizer onboard a satellite requires extensive ground command and control equipment to operate, which also adds to the complexity and costs.

Beneficially, embodiments of the present technology described herein provide for a flexible payload design using optical gateways that offer a relatively simple repeater, a relatively simple ground segment, and relatively low cost. More specifically, embodiments of the present technology utilize the resource allocator 230 (within an optical gateway 105, and more specifically, the forward link equipment 200 thereof) to provide for flexible bandwidth allocation with fine granularity, thereby eliminating the need for an expensive, heavy and high power consuming digital channelizer onboard a satellite.

FIG. 2B will now be used to provided details of the resource allocator 230 introduced in FIG. 2A, according to certain embodiments of the present technology. Referring to FIG. 2B, the resource allocator 230 is shown as including two hundred and fifty encoder and modulators 232_1 to 232_250, channel filters 234_1 to 234_250, frequency up-converters 236_1 to 236_250, and optional filters 238_1 to 238_250. Explained another way, the resource allocator 230 is shown as including two hundred and fifty channels 231_1 to 231_250, each of which includes an encoder and modulator 232, a channel filter 234, a frequency up-converter 236, and an optional filter 238. The resource allocator 230 is also shown as including a radio resource manager (RRM) 240 that is used to control the aforementioned other components of the resource allocator 230. The RRM 240 can be implemented using a combination of hardware (e.g., one or more processors), firmware and/or software. In accordance with certain embodiments, the RRM 240 can obtain downlink service link demand information from service terminals STs in real or near real time.

The encoder and modulators 232_1 to 232_250, which can be referred to collectively as the encoder and modulators 232, or individually as an encoder and modulator 232, perform encoding and modulation of the data modulated RF carriers signals output from the RFMs 224. Such data modulated RF carriers signals that are output from the RFMs 224 (and provided to the resource allocator 230) can also be referred to herein as baseband data modulated RF carrier signals, because such signals are within an original RF frequency range (preferably a relatively low intermediate frequency) before they are converted (e.g., up-converted) to a different RF frequency range which they will have when transmitted from the ground to a satellite. The encoder and modulators 232 can each perform adaptive coding and modulation (ACM) under the control of the RRM 240. In accordance with certain embodiments, the coding and modulation scheme performed by the encoder and modulators 232 (alone, or in combination with the RFMs 224 and the EOMs 204) cause the signals that are transmitted from the ground to a satellite to be in conformance with the Digital Video Broadcasting—Satellite—Second Generation (DVB-S2) standard, or the related DVB-S2X standard (which is an extension of the DVB-S2 standard).

The channel filters 234_1 to 234_250, which can be referred to collectively as the channel filters 234, or individually as a channel filter 234, shape the frequency spectrum of the data modulated RF carrier signals (after they have been encoded and modulated, but before they have been frequency-up-converted and thereafter converted to optical signals) under the control of the RRM 240. The channel filters 234 preferably provide a very steep frequency roll-off. The RRM 240 can control the bandwidth and center frequency of each of the channel filters 234 to thereby allocate and dedicate any amount of bandwidth (between zero bandwidth and maximum bandwidth) to any service downlink beam, which is also known as a user downlink beam. More specifically, referring briefly back to FIGS. 1 and 2A, assume that the satellite 100 can produce and transmit two hundred and fifty service downlink beams at any given time from the satellite 100 to service terminals STs. Based on demand, any amount of bandwidth can be allocated to each of the two hundred and fifty service beams, from zero to maximum, at any granularity. Because the optical gateway 105 transmits RF spectrum or bandwidth through optical carriers, as described above, the RF spectrum is hidden and free from spectrum regulations by the Federal Communications Communication (FCC) and other regulatory agencies. In accordance with specific embodiments, the RRM 240 ensures that frequencies allocated to adjacent service downlink beams will not overlap one another and cause excessive interference.

In accordance with certain embodiments described herein, the RF bandwidth from the optical gateway 105 is the downlink bandwidth for each service downlink beam, and thus, the bandwidth from the optical gateway 105 directly determines the forward link capacity for any given service downlink beam. Each service downlink beam can be allocated any bandwidth from zero to a maximum at the optical gateway without any spectrum constrain at the gateway because the downlink spectrum to gateway is again hidden within the optical carriers. As will be described in additional detail below, for return links, the same principle applies, and each service terminal ST can be allocated from zero up to the maximum return bandwidth at the optical gateway.

Referring again to FIG. 2B, the signals output by the channel filters can be referred to as bandwidth allocated data modulated RF signals. Downstream of each channel filter 234 is a respective frequency up-converter 236 that up-converts the frequency of the bandwidth allocated data modulated RF signals before such signals are filtered by the filters 238 and provided to the EOMs 204. The EOMs 204 convert the bandwidth allocated data modulated RF signals to optical signals, which are combined, amplified and transmitted as a collimated optical feeder uplink beam to a satellite, as can be appreciated from the above discussion of FIG. 2A. Still referring to FIG. 2B, the filters 238 that are downstream of the frequency up-converters 236 are used to filter out unwanted frequency components (e.g., unwanted mixed products) that result from the frequency up-conversions. A center frequency of the filters 238 can be fixed, or alternatively, can be controlled by the RRM 240. Where the center frequency of the filters 238 are fixed, the filters 238 can be external to the resource allocator 230, e.g., between the output of the resource allocator 230 and the inputs to the EOMs 204 in FIG. 2A. As noted above, the filters 238, since they are optional, may be eliminated.

In accordance with certain embodiments of the present technology, in order to eliminate the need for RF frequency converters in the forward link equipment onboard the satellite, the frequency up-converters 236 are configured to cause the RF frequencies of the bandwidth allocated data modulated RF signals to be equal to the desired user downlink frequency band within the Ka band (or some other allotted band). As a result, the satellite repeater is greatly simplified. For example, a portion of the Ka band that may be desirable to use for transmitting service downlink beams (also referred to as downlink user beams) from satellite 100 to service terminals ST can be from 17.7-20.2 GHz, and thus, includes a 2.5 GHz bandwidth. In such a case, each of the EOMs 204 could modulate the optical signal it receives (e.g., via an optical fiber from a respective laser 202) with a separate RF signal having a frequency within the range from 17.7-20.2 GHz. Accordingly, in this example, the frequency up-converters 236 can cause the frequencies of the bandwidth allocated data modulated RF signals to have a center frequency within the 17.7-20.2 GHz frequency range, e.g., at 18.95 GHz, but not limited thereto. For a further example, a portion of the Ka band that may be desirable to use for transmitting service downlink beams (also referred to as downlink user beams) from satellite 100 to service terminals ST can be from 17.3-20.2 GHz, and thus, includes a 2.9 GHz bandwidth. Accordingly, in this further example, the frequency up-converters 236 can cause the frequencies of the bandwidth allocated data modulated RF signals to have a center frequency within the 17.3-20.2 GHz frequency range, e.g., at 18.75 GHz, but not limited thereto.

Space Segment Forward Link Equipment

FIG. 3 will now be used to describe space segment forward link equipment 300 according to an embodiment of the present technology. Such space segment forward link equipment 300, which can also be referred to as a forward link satellite subsystem 300, or more generally, as an optical communication subsystem, is configured to receive the optical signal that is transmitted from the ground based optical gateway subsystem 200 to the satellite that is carrying the space segment forward link equipment 300. The space segment forward link equipment 300 is also configured to convert the optical signal that it receives (from the ground based optical gateway subsystem 200) into electrical signals, and to produce service beams therefrom, wherein the service beams are for transmission from the satellite to service terminals STs.

Referring to FIG. 3, the forward link satellite subsystem 300 is shown as including receiver optics 302, an optical amplifier (OA) 304, a wavelength-division multiplexing (WDM) demultiplexer (DEMUX) 306, two hundred and fifty photodetectors (PDs) 308_1 to 308_250, two hundred and fifty filters 310_1 to 310_250, two hundred and fifty low noise amplifiers (LNAs) 312_1 to 312_250, and two hundred and fifty splitters 314_1 to 314_250. The forward link satellite subsystem 300 is also shown as including five hundred filters 316_1 to 316_500, high power amplifiers (HPAs) 318_1 to 318_500, harmonic filters (HFs) 320_1 to 320_500, test couplers (TCs) 322_1 to 322_500, orthomode junctions (OMJs) 324_1 to 324_500, and feed horns 326_1 to 326_500. The PDs 308_1 to 308_250 can be referred to individually as a PD 308, or collectively as the PDs 308. The filters 310_1 to 310_250 can be referred to individually as a filter 310, or collectively as the filters 310. The LNAs 312_1 to 312_250 can be referred to individually as an LNA 312, or collectively as the LNAs 312. The filters 316_1 to 316_500 can be referred to individually as a filter 316, or collectively as the filters 316. The HPAs 318_1 to 318_500 can be referred to individually as an HPA 318, or collectively as the HPAs 318. The HFs 320_1 to 320_500 can be referred to individually as an HF 320, or collectively as the HFs 320. The TCs 322_1 to 322_500 can be referred to individually as a TC 322, or collectively as the TCs 322. The OMJs 324_1 to 324_500 can be referred to individually as an OMJ 324, or collectively as the OMJs 324. The feed horns 326_1 to 326_500 can be referred to individually as a feed horn 326, or collectively as the feed horns 326.

The receiver optics 302, which can also be referred to as a telescope, can includes optical elements such as mirrors, reflectors, filters and/or the like. The receiver optics 302 receives the optical feeder uplink beam that is transmitted through free-space to the satellite by the ground based optical gateway forward link subsystem 200, and provides the received optical feeder uplink beam (e.g., via an optical fiber) to the OA 304. A gimbal, and/or the like, can be used to control the steering of the receiver optics 302. When the optical feeder uplink beam reaches the satellite, the power of the optical feeder uplink beam is significantly attenuated compared to when it was transmitted by the ground based optical gateway subsystem 200. Accordingly, the OA 304 is used to amplify the received optical feeder uplink beam before it is provided to the WDM DEMUX 306. The OA 304 can be, e.g., an erbium-doped fiber amplifier (EDFA), but is not limited thereto. The output of the OA 304 can be referred to as an optically amplified received optical feeder uplink beam. The WDM DEMUX 306 demultiplexes (i.e., separates) the received optical feeder uplink beam (after it has been optically amplified) into two hundred and fifty separate optical signals, each of which is provided to a separate photodetector (PD) 308. Each PD 308 converts the optical signal it receives from the WDM DEMUX 306 to a respective RF electrical signal. The RF electrical signal produced by each PD 308 is provided to a respective filter (FTR) 310 (e.g., a bandpass filter) to remove unwanted frequency components and/or enhance desired frequency components. For an example, each filter 310 can pass frequencies within the range of 17.7-20.2 GHz, or within the range of 17.3-20.2 GHz, but are not limited thereto. The filtered RF electrical signal, which is output by each filter 310, is provided to a respective low noise amplifier (LNA) 312. Each LNA 312 amplifies the relatively low-power RF signal it receives from a respective filter 310 without significantly degrading the signals signal-to-noise ratio. The amplified RF signal that is output by each LNA 312 is provided to a respective splitter 314.

The splitter 314 splits the amplified RF signal it receives into two copies, each of which has half the power of the amplified RF signal that is provided to the input of the splitter 314. Each splitter 314 can be implemented by a hybrid, but is not limited thereto. In accordance with certain embodiments of the present technology, one of the RF signals that is output by a splitter 314 is used to produce one service beam, and the other RF signal that is output by the same splitter 314 is used to produce another service beam. Each of the copies of the RF signal that is output by the splitter 314 is provided to a respective filter 316. For example, the splitter 314_1 provides one copy of the RF signal it receives to the filter 316_1, and provides another copy of the RF signal it receives to the filter 316_2. In accordance with certain embodiments, the pair of filters 316 that receive RF signals from the same splitter 314 have pass bands that differ from one another. For example, the filter 316_1 may have a passband of 17.7-18.95 GHz and the filter 316_2 may have a passband of 18.95-20.2 GHz. For another example, the filter 316_1 may have a passband of 17.3-18.75 GHz and the filter 316_2 may have a passband of 18.75-20.2 GHz. This enables each splitter 314 and pair of filters 316, which are fed by the splitter 314, to separate a signal received by the splitter into two separate RF signals corresponding to two separate user beams. The use of other passbands are possible and within the scope of an embodiment of the present technology.

Each HPA 318 amplifies the RF signal it receives so that the RF signal has sufficient power to enable transmission thereof from the satellite 100 in space to an ST, which may be on the ground. Each HPA 318 can be, e.g., a liner traveling wave tube high power amplifier, but is not limited thereto. The signal that is output by each of the HPAs 318 can be referred to as an amplified RF signal. Each HF 320 is used to reduce and preferably remove any distortion in the amplified RF signal that was caused by a respective HPA 318. Each HF 320 can be, e.g., a waveguide cavity filter, but is not limited thereto. Each test coupler TC 322 can be used for power monitoring, payload testing and/or performing calibrations based on signals passing therethrough. Each OMJ 324 adds either right hand circular polarization (RHCP) or left hand circular polarization (LHCP) to the RF signal that is passed through the OMJ. This allows for color reuse frequency band allocation, wherein each color represents a unique combination of a frequency band and an antenna polarization. This way a pair of feeder beams that illuminate adjacent regions can utilize a same RF frequency band, so long as they have orthogonal polarizations. Alternatively, each OMJ 324 adds either horizontal linear polarization or vertical linear polarization to the RF signal that is passed through the OMJ. Each feed horn 326 converts the RF signal it receives, from a respective OMJ 324, to radio waves and feeds them to the rest of the antenna system (not shown) to focus the signal into a service downlink beam. A feed horn 326 and the rest of an antenna can be collectively referred to as the antenna. In other words, an antenna, as the term is used herein, can include a feed horn. All or some of the feed horns 326 can share a common reflector. Such reflector(s) is/are not shown in the Figures, to simply the Figures.

Space Segment Return Link Equipment

FIG. 4A will now be used to describe a portion of space segment return link equipment 400A, according to an embodiment of the present technology. Such space segment return link equipment 400A, which can also be referred to as a satellite return link subsystem 400A, or more generally, as an optical communication subsystem, is configured to receive the RF signals that are transmitted by service terminals STs to the satellite (e.g., 100) that is carrying the space segment return link equipment 400A. The space segment return link equipment 400A, together with the space segment return link equipment 400B in FIG. 4B, is also configured to convert the RF signals that it receives (from the service terminals STs) into optical signals, and to produce optical return feeder beams therefrom, wherein the optical return feeder beams are for transmission from the satellite (e.g., 100) to a ground based gateway (e.g., 105).

Referring to FIG. 4A, the portion of the space segment return link equipment 400A shown therein includes feed horns 402_1 to 402_500 (which can be referred to individually as a feed horn 402, or collectively as the feed horns 402), orthomode junctions (OMJs) 404_1 to 404_500 (which can be referred to individually as an OMJ 404, or collectively as the OMJs 404), test couplers (TCs) 406_1 to 406_500 (which can be referred to individually as a TC 406, or collectively as the TCs 406), pre-select filters (PFs) 408_1 to 408_500 (which can be referred to individually as a PF 408, or collectively as the PFs 408), low noise amplifiers (LNAs) 410_1 to 410_500 (which can be referred to individually as an LNA 410, or collectively as the LNAs 410), and filters (FTRs) 412_1 to 412_500 (which can be referred to individually as a filter 412, or collectively as the filters 412). The portion of the space segment return link equipment 400A shown in FIG. 4A also includes frequency down-converters (FDCs) 416_1 to 416_500 (which can be referred to individually as a frequency down-converter 416, or collectively as the frequency down-converters 416), filters (FTRs) 418_1 to 418_500 (which can be referred to individually as a filter 418, or collectively as the filters 418), and local oscillators (LOs) 422_1 to 422_10 (which can be referred to individually as an LO 422, or collectively as the LOs 422). The portion of the space segment return link equipment 400A shown in FIG. 4A also includes combiners 420_1 to 420_50 (which can be referred to individually as a combiner 420, or collectively as the combiners 420).

Each feed horn 402 gathers and focuses radio waves of a service uplink beam (e.g., 106*u*) and converts them to an RF signal that is provided to a respective OMJ 404. A feed horn 402 and the rest of an antenna can be collectively referred to as the antenna or antenna system. In other words, an antenna, as the term is used herein, can include a feed horn. All or some of the feed horns 402 can share a common reflector. Such reflector(s) is/are not shown in the Figures, to simply the Figures. Each OMJ 404 either passes through a right hand circular polarization (RHCP) or a left hand circular polarization (LHCP) RF signal. Each OMJ 404 can alternatively pass through either a horizontal or a vertical linear polarization RF signal. Each test coupler TC 406 can be used for power monitoring, payload testing and/or performing calibrations based on signals passing therethrough. Each pre-select filter (PF) 408 (e.g., a bandpass filter) is used to remove unwanted frequency components and/or enhance desired frequency components. For an example, each PF 408 can pass frequencies within the range of 29.5-30.0 GHz, but is not limited thereto. Each LNA 410 amplifies the relatively low-power RF signal it receives from a respective PF 408 without significantly degrading the signals signal-to-noise ratio. The amplified RF signal that is output by each LNA 410 is provided to a respective filter 412.

Each filter 412 allows frequencies to pass within a specified frequency range (e.g., 29.50-30.00 GHz), and the filters 418 that are downstream of the frequency down-converters 416 are used to filter out unwanted frequency components (e.g., unwanted mixed products) that result from the frequency down-conversions. The outputs of a ten (or some other number) of the filters 418 are provide to a combiner 420. For example, the filters 418_1, 418_2 . . . 418_10 provide their outputs to the combiner 420_1, . . . the filters 418_491, 418_492 (not shown) . . . and 418_500 provide their outputs to the combiner 420_50.

Each frequency down-converter 416 receives an RF signal from a filter 412 (which RF signal includes data from a uplink beam, and thus, can be referred to as an RF data signal) and an RF signal from an LO 422 (which can be referred to as an LO signal), and uses the LO signal to down-convert the RF data signal to a frequency range (e.g., 6.70-7.2 GHz, or 6.3-7.2 GHz, or some other frequency range within the 6-12 GHz band) that can be used for transmitting feeder downlink signals (e.g., 102d) to a gateway (e.g., 105). The output of each frequency down-converter 416 is provided to a filter 418. For example, the frequency down-converter 416_1 provides its output to the filter 418_1, and the frequency down-converter 416_2 provides its output to the filter 418_2. The filter 418_1 is a bandpass filter that allows frequencies to pass within a specified frequency range (e.g., 6.70-7.2 GHz, or 6.3-7.2 GHz, or some other frequency range within the 6-12 GHz band).

In the embodiment of FIG. 4A, the outputs of ten filters 418 are provided to a combiner 420. For example, the outputs of filters 418_1, 418_2, 418_3 . . . 418_10 are provided the combiner 420_1. Each combiner 420 combines the ten down-converted and filtered signals it receives into a combined signal that includes data modulated RF carriers for ten service uplink beams. In other words, the output of each combiner 420 includes data received from ten service uplink beams associated with at least ten service terminals STs. The output of each combiner 420 is provided to a separate EOM 434, as will be discussed below with reference to FIG. 4B.

FIG. 4B will now be used to describe a further portion of the space segment return link equipment 400B that is used to convert the data modulated RF carrier signals into a collimated optical downlink feeder beam that is aimed at a gateway. Referring to FIG. 4B, the portion of the space segment return link equipment 400B is shown as including fifty lasers 432_1 to 432_50, fifty electro-optical modulator (EOMs) 434_1 to 434_50, a wavelength-division multiplexing (WDM) multiplexer (MUX) 436, an optical amplifier (OA) 438 and transmitter optics 440. Each of these elements are described below.

The fifty separate lasers 432_1 to 432_50 each emit light of a different wavelength within a specified wavelength range. The lasers can be referred to individually as a laser 432, or collectively as the lasers 432. Where the specified wavelength range is, for example, from 1560 nm to 1570 nm, then the laser 432_1 may emit light having a peak wavelength of 1560 nm, the laser 432_2 may emit light having a peak wavelength of 1560.2 nm, the laser 432_3 (not shown) may emit light having a peak wavelength of 1560.4 nm, . . . the laser 432_49 may emit light having a peak wavelength of 1669.8 nm, and the laser 432_50 may emit light having a peak wavelength of 1670.0 nm. In other words, the peak wavelengths emitted by the lasers 432 can occur at 0.2 nm intervals from 1560 nm to 1570 nm. The wavelength range from 1560 nm to 1570 nm, which is within the IR spectrum, is practical to use because IR lasers for use in communications are readily available. However, wider or narrow wavelength ranges, within the same or other parts of the optical spectrum, may alternatively be used. For example, it would also be possible to utilize a wavelength range within the 400 nm-700 nm visible spectrum. It is also possible that the wavelength range that is specified for use in producing the optical feeder downlink beam (e.g., 102d) is non-contiguous. For example, the wavelength range that is for use in producing the optical feeder downlink beam can be from 1535 nm to 1540 nm and from 1565 nm to 1575 nm. These are just a few examples, which are not intended to be all encompassing. Further, it is also possible that space segment return link equipment can alternatively include more or less than fifty lasers (that each emit light of a different peak wavelength within a specified contiguous or non-contiguous wavelength range). Additionally, it is noted that the space segment return link equipment may include two or more of each of the lasers (that each emit light of a different peak wavelength within a specified contiguous or non-contiguous wavelength range) to provide for redundancy or backup. Each of the lasers 432 can be, for example, a diode-pumped infrared neodymium laser, although the use of other types of lasers are also within the scope of the embodiments described herein.

In accordance with certain embodiments, the space segment return link equipment 400B includes less lasers (e.g., fifty lasers 432) for use in generating the optical feeder downlink beam that is aimed from the satellite 100 to the gateway 105, than the gateway forward link equipment 200 includes (e.g., two hundred and fifty lasers 202) for generating the optical feeder uplink beam that is aimed from the gateway 105 to the satellite 100. This is made possible due to current asymmetric capacity requirements between the forward and return feeder links. More specifically, a feeder downlink beam (e.g., 102d) carries significantly less data than a feeder uplink beam (e.g., 102u), because service terminals STs typically download much more data than they upload.

On the return link, given the current asymmetric capacity requirements between the forward and return links, the space segment return link equipment can be implemented to handle less demand that the ground based forward link equipment. As an example, if each RF service uplink beam is assumed to have only 320 MHz per beam, then a total of 160 GHz needs to be sent from a satellite to a gateway on the optical feeder downlink beam. Several beams' frequencies can be grouped together to create a 4 GHz bandwidth which is then transmitted on each of fifty laser wavelengths that are multiplexed together and transmitted to the ground. An alternative implementation would be to aggregate the 4 GHz spectrum with filtering post LNA to eliminate the RF frequency conversion and as above directly modulate the RF spectrum on each of the fifty laser wavelengths. An alternative implementation would be to use only RF LNAs for each feed, modulate each 320 MHz segment of bandwidth onto a single laser and combine two hundred and fifty laser wavelengths together, thus eliminating the need for RF frequency converters. Depending on the number of service beams and feeder beams required, one or the other configuration can be selected to provide the lowest mass solution.

The light emitted by each of the fifty lasers 432, which can be referred to as an optical carrier signal, is provided (e.g., via a respective optical fiber) to a respective one of the fifty separate EOMs 434_1 to 434_50. The EOMs can be referred to individually as an EOM 434, or collectively as the EOMs 434. Each of the EOMs 434 is an optical device in which a signal-controlled element exhibiting an electro-optic effect is used to modulate a respective beam of light. The modulation performed by the EOMs 434 may be imposed on the phase, frequency, amplitude, or polarization of a beam of light, or any combination thereof. In accordance with a specific embodiment, each of the EOMs 434 is a phase modulating EOM that is used as an amplitude modulator by using a Mach-Zehnder interferometer. In other words, each of the EOMs 434 can be implemented as a Mach-Zehnder modulator (MZM), which can be a Lithium Niobate Mach-Zehnder modulator, but is not limited thereto. In accordance with specific embodiments, each of the EOMs 434 is implemented as an MZM that produces an amplitude modulated (AM) optical waveform with a modulation index between 10% and 80% in order to maintain fidelity of an RF waveform (modulated therein) without too much distortion. The optical signal that is output by each of the EOMs 434 can be referred to as an optical data signal. The modulation scheme that is implemented by the EOMs 434 can result in double- or vestigial-sidebands, including both an upper sideband (USB) and a lower sideband (LSB). Alternatively single-sideband modulation (SSB) can be utilized to increase bandwidth and transmission power efficiency.

The fifty separate optical data signals that are output by the fifty EOMs 434 are provided to the WDM MUX 436, which can also be referred to as a dense wavelength division multiplexing (DWDM) MUX. The WMD MUX 436 multiplexes (i.e., combines) the fifty optical data signals, received from the fifty EOMs 434, onto a single optical fiber, with each of the fifty separate optical data signals being carried at the same time on its own separate optical wavelength within a specified contiguous wavelength range (e.g., from 1560 nm to 1570 nm) or non-contiguous wavelength range (e.g., from 1510 nm to 1535 nm, and from 1540 nm to 1565 nm). For example, as explained above, the fifty optical data signals can have peak wavelengths that occur at 0.2 nm intervals from 1560 nm to 1570 nm.

The signal that is output by the WMD MUX 436, which can be referred to as a wavelength division multiplexed optical signal, is provided to the optical amplifier (OA) 438. The OA 438 amplifies the wavelength division multiplexed optical signal so that the wavelength division multiplexed optical signal has sufficient power to enable transmission thereof from the satellite 100 in free-space to the gateway 105. The OA 438 can be an erbium-doped fiber amplifier (EDFA), but is not limited thereto. The output of the OA 438 can be referred to as an optically amplified wavelength division multiplexed optical signal.

The optically amplified wavelength division multiplexed optical signal, which is output by the OA 438, is provided (e.g., via an optical fiber) to the transmitter optics 440. The transmitter optics 440, which can also be referred to as a telescope, can includes optical elements such as lenses, mirrors, reflectors, filters and/or the like. The transmitter optics 440 outputs a collimated optical feeder downlink beam that is aimed at a satellite. A gimbal, and/or the like, can be used to control the steering of the transmitter optics 440. In accordance with an embodiment, the collimated optical feeder downlink beam has an aperture of about 40 cm, and a half beam divergence of about 0.0000012 radians, wherein the term "about" as used herein means +/−10 percent of a specified value. The use of other apertures and half beam divergence values are also within the scope of the embodiments described herein. The collimated optical feeder downlink beam, which is output by the transmitter optics 440, is transmitted in free-space to receiver optics in the gateway 105.

A space segment (e.g., a satellite 100) can have different optics that are used for transmitting an optical feeder downlink beam (e.g., 102d) to a gateway, than the optics that are used for receiving an optical feeder uplink beam (e.g., 102u) from a gateway. Alternatively, and preferably, to reduce the weight that needs to be carried by the space segment (e.g., a satellite 100), the same optics can be used for both transmitting an optical feeder downlink beam (e.g., 102d) to a gateway and for receiving an optical feeder uplink beam (e.g., 102u) from a gateway. More specifically, the TX optics 440 shown in FIG. 4B can be the same as the RX optics 302 shown in FIG. 3. Additional and/or alternative components can be shared between the space segment forward link equipment shown in FIG. 3 and the space segment return link equipment shown in FIGS. 4A and 4B. For example, the feed horns 326 in FIG. 3 can be the same as the feed horns 402 shown in FIG. 4A. For another example, the OMJs 324 in FIG. 3 can be the same as the OMJs 404 in FIG. 4A, if the OMJs are implement as a three-port device. These are just a few example, which are not intended to be all encompassing.

Referring again to the EOMs 434 in FIG. 4B, in accordance with certain embodiments of the present technology, each of the EOMs 434 modulates the optical signal it receives (e.g., via an optical fiber from a respective laser 432) with a separate RF signal that has already been modulated to include user data. For example, the EOM 434_1 modulates the optical signal it receives from the laser 431_1 with a data modulated RF carrier signal it receives from the combiner 420_1 (in FIG. 4A). The data modulated RF carrier signal that the EOM 434_1 receives from a combiner (420_1 in FIG. 4A) can include data corresponding to ten service uplink beams received from service terminals STs. Similarly, the EOMs 434_2 to 434_50 can each receive a different data modulated RF carrier signal, from a different combiner 420, with each data modulated RF carrier signal corresponding to a different group of ten service uplink beams received from service terminals STs. In this manner, the EOMs 434 can be collectively provided with data modulated RF carrier signals corresponding to five hundred service uplink beams (i.e., 50*10=500).

Gateway Return Link Equipment

FIG. 5 will now be used to describe gateway return link equipment 500, according to an embodiment of the present technology. Such gateway return link equipment 500 can also be referred to as an optical gateway return link subsystem 500, or more generally, as an optical communication subsystem. Referring to FIG. 5, the optical gateway return link subsystem 500 is shown as including receiver optics 502, an optical amplifier (OA) 504, a wavelength-division multiplexing (WDM) demultiplexer (DEMUX) 506, fifty photodetectors (PDs) 508_1 to 508_50, fifty filters 510_1 to 510_50, fifty low noise amplifiers (LNAs) 512_1 to 512_50, and fifty frequency down-converters 514_1 to 514_50. The optical gateway return link subsystem 500 is also shown as including fifty demodulator and digital signal processor (DSP) blocks 516_1 to 516_50, and ten local oscillators (LOs) 522_1 to 522_10 (which can be referred to individually as an LO 522, or collectively as the LOs 522).

The receiver optics 502, which can also be referred to as a telescope, can includes optical elements such as mirrors, reflectors, filters and/or the like. The receiver optics 502 receives the optical feeder downlink beam (e.g., 102d) that is transmitted through free-space from a space segment (e.g., a satellite 100), by the space based return link subsystem 400A and 400B, and provides the received optical feeder downlink beam (e.g., via an optical fiber) to the OA 504. A gimbal, and/or the like, can be used to control the steering of the receiver optics 502. When the optical feeder downlink beam reaches the gateway, the power of the optical feeder downlink beam is significantly attenuated compared to when it was transmitted by the space based return link subsystem. Accordingly, the OA 504 is used to amplify the received optical feeder downlink beam before it is provided to the WDM DEMUX 506. The OA 504 can be, e.g., an erbium-doped fiber amplifier (EDFA), but is not limited thereto. The output of the OA 504 can be referred to as an optically amplified received optical feeder downlink beam. The WDM DEMUX 506 demultiplexes (i.e., separates) the received optical feeder uplink beam (after it has been optically amplified) into fifty separate optical signals, each of which is provided to a separate photodetector (PD) 508. Each PD 508 converts the optical signal it receives from the WDM DEMUX 506 to a respective RF electrical signal. The RF electrical signal produced by each PD 508 is provided to a respective filter (FTR) 510 (e.g., a bandpass filter) to remove unwanted frequency components and/or enhance desired frequency components. For an example, where frequency down-conversions were performed on the satellite (by the space segment return link equipment 400A), each filter 510 can pass frequencies within the range of 6.70-7.2 GHz, or within the range of 6.3-7.2 GHz, but are not limited thereto. For another example, where frequency down-conversions were not performed on the satellite, each filter 510 can pass frequencies within the range of 29.5-30 GHz, but are not limited thereto. The filtered RF electrical signal, which is output by each filter 408, is provided to a respective low noise amplifier (LNA) 512. Each LNA 512 amplifies the relatively low-power RF signal it receives from a respective filter 510 without significantly degrading the signals signal-to-noise ratio. The amplified RF signal that is output by each LNA 512 is provided to a respective frequency down-converter 514, the output of which is provided to a respective demodulator and DSP block 516.

Each frequency down-converter 514 receives an RF signal from an LNA 512 (which RF signal includes data from subscriber terminals STs, and thus, can be referred to as an RF data signal) and an RF signal from an LO 452 (which can be referred to as an LO signal), and uses the LO signal to down-convert the RF data signal to baseband. The baseband data signal output by each frequency down-converter 514 is provided to a respective demodulator and DSP block 516. Each demodulator and DSP block 516 demodulates the baseband data signal it receives, and performs digital signal processing thereon. Such a demodulated data signal can be used to provide data to, or request data from, a server, client and/or the like that is coupled to a network (e.g., the network 140 in FIG. 1).

A gateway (e.g., 105) can have different optics that are used for transmitting an optical feeder uplink beam (e.g., 102u) to a space segment (e.g., satellite 100), than the optics that are used for receiving an optical feeder downlink beam (e.g., 102d) from a space segment. Alternatively, a gateway can use the same optics for both transmitting an optical feeder uplink beam (e.g., 102u) to a space segment and for receiving an optical feeder downlink beam (e.g., 102d) from a space segment. More specifically, the RX optics 502 shown in FIG. 5 can be the same as the TX optics 210 shown in FIG. 2A.

Methods

Figure 6:
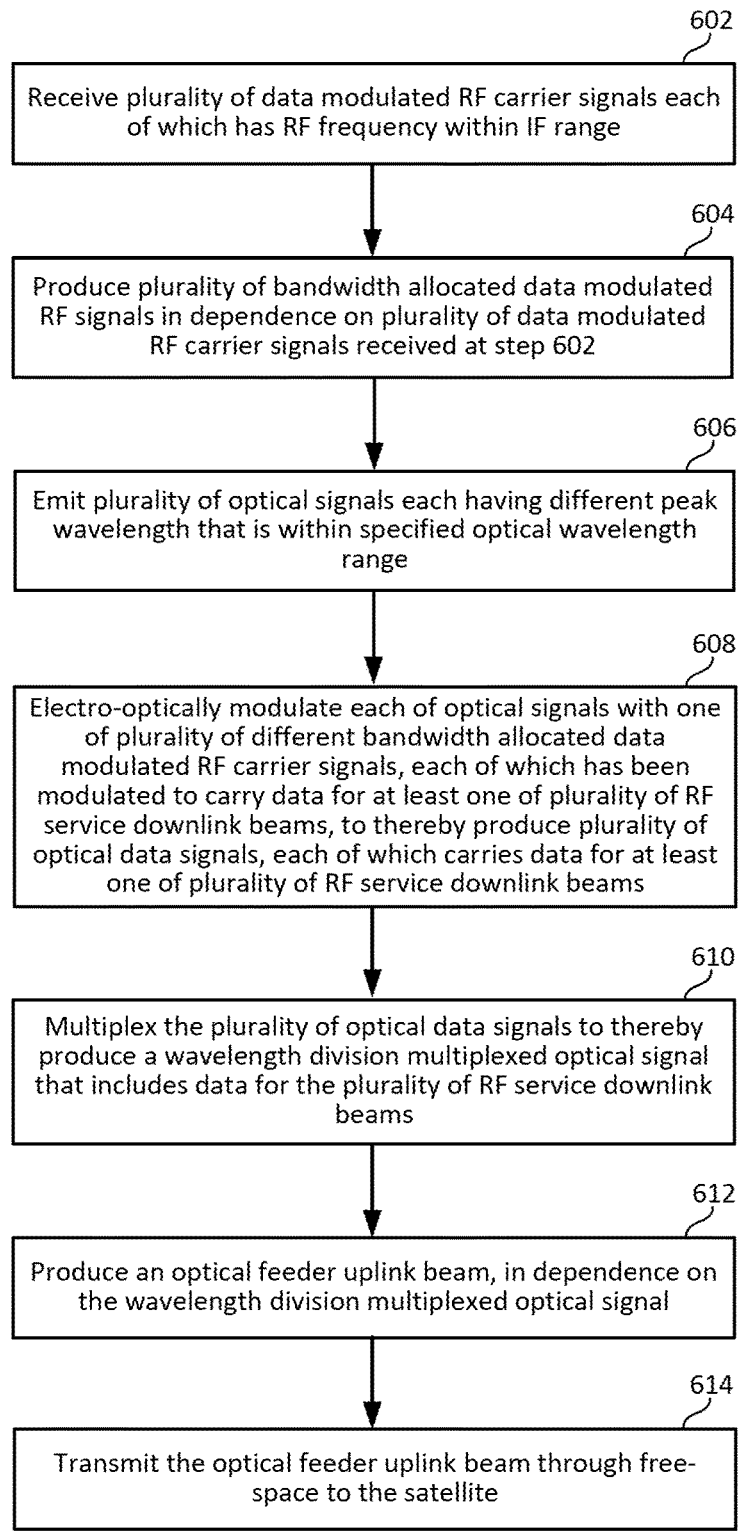
FIG. 6 is a high level flow diagram that is used to summarize methods for enabling a ground based subsystem to produce and transmit an optical feeder uplink beam to a satellite, according to certain embodiments of the present technology.

FIG. 6 will now be used to summarize methods for enabling a ground based subsystem (e.g., the gateway forward link equipment 200 in FIG. 2A) to produce and transmit an optical feeder uplink beam (e.g., 102u in FIG. 1) to a satellite (e.g., 100 in FIG. 1) that is configured to receive the optical feeder uplink beam and in dependence thereon produce and transmit a plurality of RF service downlink beams (e.g., 106d, 110d, 114d and 118d in FIG. 1) within a specified RF frequency range to service terminals STs. In accordance with certain embodiments, the specified RF frequency range within which the satellite is configured to produce and transmit a plurality of RF service downlink beams is a downlink portion of the Ka band. The downlink portion of the Ka band can be from 17.7 GHz to 20.2 GHz, and thus, have a bandwidth of 2.5 GHz. Alternatively, the downlink portion of the Ka band can be from 17.3 GHz to 20.2 GHz, and thus, have a bandwidth of 2.9 GHz. These are just a few examples, which are not intended to be all encompassing.

Referring to FIG. 6, step 602 involves receiving a plurality of data modulated RF carrier signals each of which has an RF frequency within an intermediate frequency (IF) range. Step 602 can be performed, e.g., by the resource allocator 230 described above with reference to FIGS. 2A and 2B. Prior to step 602, the method can involve producing a plurality of radio frequency (RF) carrier signals within the IF range, receiving a plurality of data signals, and modulating each of the plurality of data signals onto one of the RF carrier signals to thereby produce the data modulated RF carrier signals. Such steps can be performed, e.g., by the LOs 222 and the RFMs 224 described above with reference to FIG. 2A.

Still referring to FIG. 6, step 604 involves producing a plurality of bandwidth allocated data modulated RF signals in dependence on the plurality of data modulated RF carrier signals. Step 604 can be performed, e.g., by the resource allocator 230 described above with reference to FIGS. 2A and 2B.

Step 606 involves emitting a plurality of optical signals each having a different peak wavelength that is within a specified optical wavelength range. Step 606 can be performed by the lasers 202 described above with reference to FIG. 2A. The specified optical wavelength range may be within the C-band and/or L-band optical wavelengths, as explained above. Further, as explained above, the specified optical wavelength range can be a contiguous optical wavelength range within an IR spectrum, or a non-contiguous optical wavelength range within the IR spectrum. As noted above, visible and/or other optical wavelengths may alternatively be used.

Step 608 involves electro-optically modulating each of the optical signals with one of a plurality of different bandwidth allocated data modulated RF carrier signals, each of which has been modulated to carry data for at least one of the plurality of RF service downlink beams, to thereby produce a plurality of optical data signals, each of which carries data for at least one of the plurality of RF service downlink beams. Step 608 can be performed by the EOMs 204 described above with reference to FIG. 2A.

Step 610 involves multiplexing the plurality of optical data signals to thereby produce a wavelength division multiplexed optical signal that includes data for the plurality of RF service downlink beams. Step 610 can be performed using the WDM MUX 206 discussed above with reference to FIG. 2A.

Step 612 involves producing an optical feeder uplink beam, in dependence on the wavelength division multiplexed optical signal, and step 614 involves transmitting the optical feeder uplink beam through free-space to the satellite. Steps 612 and 614 can be performed by the transmitter optics 210 discussed above with reference to FIG. 2A. The optical amplifier (OA) 208 discussed above with reference to FIG. 2A can also be used to perform step 612.

In accordance with certain embodiments, each of the plurality of optical data signals resulting from the electro-optically modulating at step 608 has an RF frequency within the same specified RF frequency range within which the satellite is configured to transmit the plurality of RF service downlink beams. In such embodiments, beneficially, because RF frequencies of the optical data signals resulting from the electro-optically modulating are within the same specified RF frequency range within which the satellite is configured to transmit the plurality of RF service downlink beams, there is an elimination of any need for the satellite to perform any frequency conversions when producing the plurality of RF service downlink beams in dependence on the optical feeder uplink beam. In other words, the space segment forward link equipment 300 in FIG. 3 beneficially does not need any frequency down-converters or any other type of frequency conversion equipment.

Figure 7:
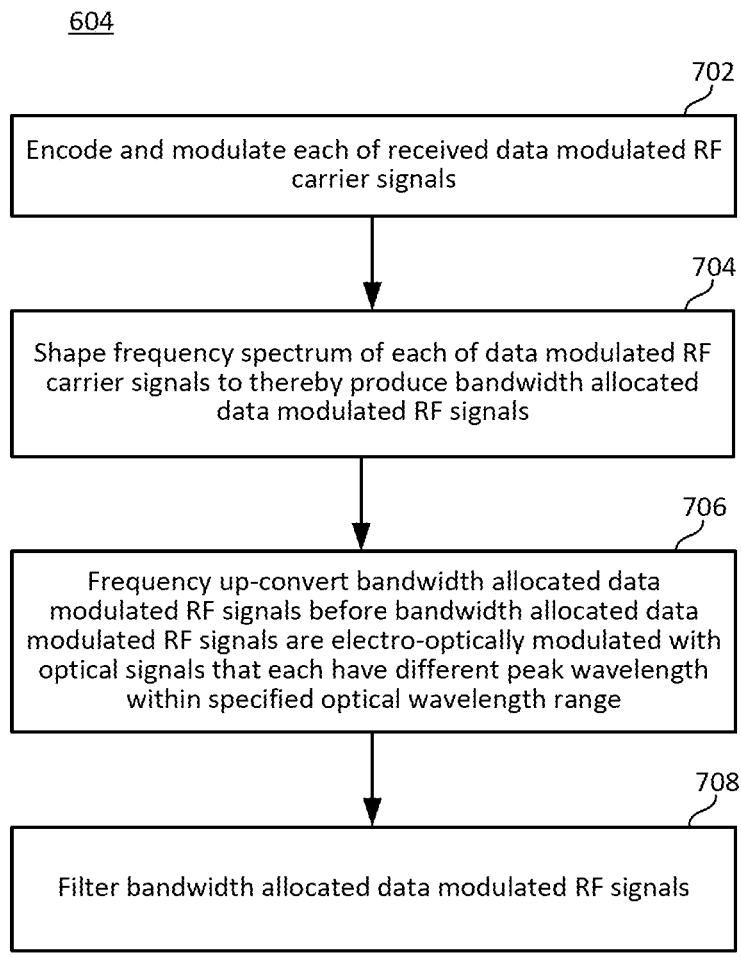
FIG. 7 is a high level flow diagram that is used to describe additional details of one of the steps introduced with reference to FIG. 6, according to certain embodiments of the present technology.

Additional details of step 604 according to certain embodiments of the present technology, which can be performed by the resource allocator 230 described above with reference to FIGS. 2A and 2B, will now be described with reference to FIG. 7. More specifically, FIG. 7 is used to explain how a plurality of bandwidth allocated data modulated RF signals can be produced at step 604 in dependence on the plurality of data modulated RF carrier signals. Referring to FIG. 7, step 702 involves encoding and modulating each of the received data modulated RF carrier signals. Step 702 can be performed by the encoders and modulators 232 described above with reference to FIG. 2B.

Still referring to FIG. 7, step 704 involves shaping a frequency spectrum of each of the data modulated RF carrier signals (after the encoding and modulating thereof) to thereby produce bandwidth allocated data modulated RF signals. Step 704 can be performed by the channel filters 234 described above with reference to FIG. 2B.

Step 706 involves frequency up-converting the bandwidth allocated data modulated RF signals before the bandwidth allocated data modulated RF signals are electro-optically modulated with the optical signals that each have the different peak wavelength that is within the specified optical wavelength range. Step 706 can be performed by the frequency up-converters 236 described above with reference to FIG. 2B. In accordance with certain embodiments, the bandwidth allocated data modulated RF signals may optionally be filtered at step 708, downstream of the frequency up-converting, before being electro-optically modulated, to thereby filter out mixed products that result from the frequency up-converting. Such optional filtering can be performed by the filters 238 described above with reference to FIG. 2B.

Further details of the methods described with reference to FIGS. 6 and 7 can be appreciated from the above description of FIGS. 1-5.

Certain embodiments of the present technology described above relate to a ground based subsystem for use in transmitting an optical feeder uplink beam to a satellite that is configured to receive the optical feeder uplink beam and in dependence thereon produce and transmit a plurality of RF service downlink beams within a specified RF frequency range to service terminals. In accordance with certain embodiments, the ground based subsystem includes a resource allocator configured to receive a plurality of data modulated RF carrier signals each of which has an RF frequency within an intermediate frequency (IF) range, and configured to encode, modulate, filter and frequency up-convert each of the data modulated RF carrier signals to thereby produce a plurality of bandwidth allocated data modulated RF signals. Additionally, the the ground based subsystem includes a plurality of lasers, a plurality of electro-optical modulators (EOMs), a wavelength-division multiplexing (WDM) multiplexer, an optical amplifier, and transmitter optics. Each of the lasers is operable to emit an optical signal having a different peak wavelength within a specified optical wavelength range. Each of the EOMs is configured to receive an optical signal from a respective one of the plurality of lasers, receive a different bandwidth allocated data modulated RF carrier signal from the resource allocator that has been modulated to carry data for at least one of the plurality of RF service downlink beams, and output an optical data signal carrying data for at least one of the plurality of RF service downlink beams. The WDM multiplexer is configured to receive the optical data signals output by the plurality of EOMs, and combine the plurality of optical data signals into a wavelength division multiplexed optical signal. The optical amplifier is configured to amplify the wavelength division multiplexed optical signal to thereby produce an optically amplified wavelength division multiplexed optical signal. The transmitter optics is configured to receive the optically amplified wavelength division multiplexed optical signal and transmit an optical feeder uplink beam to the satellite in dependence thereon.

In accordance with certain embodiments, the optical data signals output by the plurality of EOMs each have an RF frequency within the same specified RF frequency range within which the satellite is configured to transmit the plurality of RF service downlink beams. Beneficially, in such embodiments, because RF frequencies of the optical data signals output by the plurality of EOMs are within the same specified RF frequency range within which the satellite is configured to transmit the plurality of RF service downlink beams, there is an elimination of any need for the satellite to perform any frequency conversions when producing the plurality of RF service downlink beams in dependence on the optical feeder uplink beam.

In accordance with certain embodiments, the resource allocator includes a plurality of channels each of which includes an encoder and modulator, a channel filter and a frequency up-converter. The encoder and modulator of a channel is configured to perform encoding and modulation of one of the data modulated RF carrier signals received by the resource allocator. The channel filter of the channel is configured to shape a frequency spectrum of one of the data modulated RF carrier signals after the encoding and modulation thereof to thereby produce a bandwidth allocated data modulated RF signal. The frequency up-converter of the channel is configured to up-convert a frequency of the bandwidth allocated data modulated RF signal produced by the channel filter before the bandwidth allocated data modulated RF signal is provided to one of the EOMs. Each channel can also include a further filter, downstream of the frequency up-converter. The bandwidth allocated data modulated RF signals may optionally be filtered by such further filters, downstream of the frequency up-converts, before being provided to the EOMs, to thereby filter out mixed products that result from the frequency up-conversions.

In accordance with certain embodiments, the resource allocator further includes a radio resource manager (RRM) that is configured to control the channel filters of the resource allocator to ensure that frequencies allocated to adjacent ones of the service downlink beams do not overlap one another. In accordance with certain embodiments, the channel filters of the resource allocator are configured to allocate any amount of bandwidth within a bandwidth range, between zero bandwidth and a maximum bandwidth, to any one of the service downlink beams, under the control of the RRM. Beneficially, the resource allocator eliminates of any need for the satellite to perform any bandwidth allocation for the plurality of service downlink beams produced and transmitted by the satellite, thereby eliminating any need for the satellite to include an on-board channelizer.

In accordance with certain embodiments, the ground based subsystem also includes a plurality of radio frequency modulator (RFMs), wherein each of the RFMs is configured to receive a radio frequency (RF) carrier signal and a data signal, and modulate the data signal it receives onto the RF carrier signal it receives to produce one of the data modulated RF carrier signals that are received by the resource allocator. The ground based subsystem can also include one or more oscillators configured to produce the RF carrier signals that are provided to the RFMs. The RF carrier signals provided to the RFMs can be within the IF frequency range, and the resource allocator can be configured to perform its encoding and modulation within the IF frequency range.

Certain embodiments of the present technology are directed to methods for enabling a ground based subsystem to produce and transmit an optical feeder uplink beam to a satellite that is configured to receive the optical feeder uplink beam and in dependence thereon produce and transmit a plurality of RF service downlink beams within a specified RF frequency range to service terminals. Such methods, which are for use by the ground based subsystem, can include receiving a plurality of data modulated RF carrier signals each of which has an RF frequency within an intermediate frequency (IF) range. The methods can also include producing a plurality of bandwidth allocated data modulated RF signals in dependence on the plurality of data modulated RF carrier signals. Additionally, the methods can include emitting a plurality of optical signals each having a different peak wavelength that is within a specified optical wavelength range, and electro-optically modulating each of the optical signals with one of a plurality of different bandwidth allocated data modulated RF carrier signals, each of which has been modulated to carry data for at least one of the plurality of RF service downlink beams, to thereby produce a plurality of optical data signals, each of which carries data for at least one of the plurality of RF service downlink beams. The methods can also include multiplexing the plurality of optical data signals to thereby produce a wavelength division multiplexed optical signal that includes data for the plurality of RF service downlink beams. Further, the methods can include producing an optical feeder uplink beam, in dependence on the wavelength division multiplexed optical signal, and transmitting the optical feeder uplink beam through free-space to the satellite.

In accordance with certain embodiments, each of the plurality of optical data signals resulting from the electro-optically modulating has an RF frequency within the same specified RF frequency range within which the satellite is configured to transmit the plurality of RF service downlink beams. In such embodiments, beneficially, because RF frequencies of the optical data signals resulting from the electro-optically modulating are within the same specified RF frequency range within which the satellite is configured to transmit the plurality of RF service downlink beams, there is an elimination of any need for the satellite to perform any frequency conversions when producing the plurality of RF service downlink beams in dependence on the optical feeder uplink beam.

In certain embodiments, the step of producing a plurality of bandwidth allocated data modulated RF signals, in dependence on the plurality of data modulated RF carrier signals, includes encoding and modulating each of the received data modulated RF carrier signals, and shaping a frequency spectrum of each of the data modulated RF carrier signals after the encoding and modulating thereof to thereby produce bandwidth allocated data modulated RF signals. Such embodiments also include frequency up-converting the bandwidth allocated data modulated RF signals before the bandwidth allocated data modulated RF signals are electro-optically modulated with the optical signals that each have the different peak wavelength that is within the specified optical wavelength range. The bandwidth allocated data modulated RF signals may optionally be filtered, downstream of the frequency up-converting, before being electro-optically modulated, to thereby filter out mixed products that result from the frequency up-converting.

In certain embodiments, the shaping the frequency spectrum of each of the data modulated RF carrier signals is performed in a manner that ensures that frequencies allocated to adjacent ones of the service downlink beams do not overlap one another.

In certain embodiments, the shaping the frequency spectrum of each of the data modulated RF carrier signals is performed to allocate any amount of bandwidth within a bandwidth range, between zero bandwidth and a maximum bandwidth, to any one of the service downlink beams. In such embodiments, because any amount of bandwidth within the bandwidth range, between zero bandwidth and the maximum bandwidth, can be allocated to any one of the service downlink beams, there is an elimination of any need for the satellite to include an on-board channelizer.

The above summarized methods can also include producing a plurality of radio frequency (RF) carrier signals within the IF range, receiving a plurality of data signals, and modulating each of the plurality of data signals onto one of the RF carrier signals to thereby produce the data modulated RF carrier signals.

Certain embodiments of the present technology are related to a resource allocator for inclusion in a ground based subsystem for use in transmitting an optical feeder uplink beam to a satellite that is configured to receive the optical feeder uplink beam and in dependence thereon produce and transmit a plurality of RF service downlink beams. The recourse allocator includes a plurality of channels each of which includes an encoder and modulator, a channel filter, and a frequency up-converter, details of which have been described above.

Certain embodiments of the present technology are directed to methods for use by a resource allocator within in a ground based subsystem for use in transmitting an optical feeder uplink beam to a satellite that is configured to receive the optical feeder uplink beam and in dependence thereon produce and transmit a plurality of RF service downlink beams. Such a method can include receiving a plurality of data modulated RF carrier signals, encoding and modulating each of the received data modulated RF carrier signals, shaping a frequency spectrum of each of the data modulated RF carrier signals after the encoding and modulating thereof to thereby produce bandwidth allocated data modulated RF signals, and frequency up-converting the bandwidth allocated data modulated RF signals before the bandwidth allocated data modulated RF signals are electro-optically modulated with the optical signals that each have the different peak wavelength that is within the specified optical wavelength range. In accordance with certain embodiments, the shaping the frequency spectrum of each of the data modulated RF carrier signals is performed to ensure that frequencies allocated to adjacent ones of the service downlink beams do not overlap one another. Additional details of such methods can be appreciated from the above discussion.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

What is claimed is:

1. A ground based subsystem for use in transmitting an optical feeder uplink beam to a satellite that is configured to receive the optical feeder uplink beam and in dependence thereon produce and transmit a plurality of RF service downlink beams within a specified RF frequency range to service terminals, the ground based subsystem comprising:
   a resource allocator configured to receive a plurality of data modulated RF carrier signals each of which has an RF frequency within an intermediate frequency (IF) range, and configured to encode, modulate, filter and frequency up-convert each of the data modulated RF carrier signals to thereby produce a plurality of bandwidth allocated data modulated RF signals;
   a plurality of lasers, each of the lasers operable to emit an optical signal having a different peak wavelength within a specified optical wavelength range;
   a plurality of electro-optical modulators (EOMs), each of the EOMs configured to receive an optical signal from a respective one of the plurality of lasers, receive a different bandwidth allocated data modulated RF carrier signal from the resource allocator that has been modulated to carry data for at least one of the plurality of RF service downlink beams, and output an optical data signal carrying data for at least one of the plurality of RF service downlink beams;
   a wavelength-division multiplexing (WDM) multiplexer configured to receive the optical data signals output by the plurality of EOMs, and combine the plurality of optical data signals into a wavelength division multiplexed optical signal;
   an optical amplifier configured to amplify the wavelength division multiplexed optical signal to thereby produce an optically amplified wavelength division multiplexed optical signal; and
   transmitter optics configured to receive the optically amplified wavelength division multiplexed optical signal and transmit an optical feeder uplink beam to the satellite in dependence thereon;
   wherein the resource allocator comprises a plurality of channels each of which includes
      an encoder and modulator configured to perform encoding and modulation of one of the data modulated RF carrier signals received by the resource allocator;
      a channel filter configured to shape a frequency spectrum of one of the data modulated RF carrier signals after the encoding and modulation thereof to thereby produce a bandwidth allocated data modulated RF signal; and
      a frequency up-converter configured to up-convert a frequency of the bandwidth allocated data modulated RF signal produced by the channel filter before the bandwidth allocated data modulated RF signal is provided to one of the EOMs; and
   wherein the channel filters of the resource allocator are configured to selectively allocate any one of a plurality of different amounts of bandwidth within a bandwidth range, between and inclusive of zero amount of bandwidth within the bandwidth range and a maximum amount of bandwidth within the bandwidth range, to any one of the service downlink beams.

2. The subsystem of claim 1,
   wherein the bandwidth allocated data modulated RF signals are filtered by further filters, downstream of the frequency up-converts, before being provided to the EOMs, to thereby filter out mixed products that result from the frequency up-conversions.

3. The subsystem of claim 1, wherein the resource allocator further comprises a radio resource manager (RRM) that is configured to control the channel filters of the resource allocator to ensure that frequencies allocated to adjacent ones of the service downlink beams do not overlap one another.

4. The subsystem of claim 1, wherein the resource allocator eliminates of any need for the satellite to perform any bandwidth allocation for the plurality of service downlink beams produced and transmitted by the satellite, thereby eliminating any need for the satellite to include an on-board channelizer.

5. The subsystem of claim 1, further comprising:
   a plurality of radio frequency modulator (RFMs), each of the RFMs configured to receive a radio frequency (RF) carrier signal and a data signal, and modulate the data signal it receives onto the RF carrier signal it receives to produce one of the data modulated RF carrier signals that are received by the resource allocator; and
   one or more oscillators configured to produce the RF carrier signals that are provided to the RFMs.

6. The subsystem of claim 5, wherein:
   the RF carrier signals provided to the RFMs are within the IF frequency range; and
   the resource allocator is configured to perform encoding and modulation within the IF frequency range.

7. A ground based subsystem for use in transmitting an optical feeder uplink beam to a satellite that is configured to receive the optical feeder uplink beam and in dependence thereon produce and transmit a plurality of RF service downlink beams within a specified RF frequency range to service terminals, the ground based subsystem comprising:
a resource allocator configured to receive a plurality of data modulated RF carrier signals each of which has an RF frequency within an intermediate frequency (IF) range, and configured to encode, modulate, filter and frequency up-convert each of the data modulated RF carrier signals to thereby produce a plurality of bandwidth allocated data modulated RF signals;
a plurality of lasers, each of the lasers operable to emit an optical signal having a different peak wavelength within a specified optical wavelength range;
a plurality of electro-optical modulators (EOMs), each of the EOMs configured to receive an optical signal from a respective one of the plurality of lasers, receive a different bandwidth allocated data modulated RF carrier signal from the resource allocator that has been modulated to carry data for at least one of the plurality of RF service downlink beams, and output an optical data signal carrying data for at least one of the plurality of RF service downlink beams;
a wavelength-division multiplexing (WDM) multiplexer configured to receive the optical data signals output by the plurality of EOMs, and combine the plurality of optical data signals into a wavelength division multiplexed optical signal;
an optical amplifier configured to amplify the wavelength division multiplexed optical signal to thereby produce an optically amplified wavelength division multiplexed optical signal; and
transmitter optics configured to receive the optically amplified wavelength division multiplexed optical signal and transmit an optical feeder uplink beam to the satellite in dependence thereon;
wherein the optical data signals output by the plurality of EOMs each have an RF frequency within the same specified RF frequency range within which the satellite is configured to transmit the plurality of RF service downlink beams; and
wherein because RF frequencies of the optical data signals output by the plurality of EOMs are within the same specified RF frequency range within which the satellite is configured to transmit the plurality of RF service downlink beams, there is an elimination of any need for the satellite to perform any frequency conversions when producing the plurality of RF service downlink beams in dependence on the optical feeder uplink beam.

8. A method for enabling a ground based subsystem to produce and transmit an optical feeder uplink beam to a satellite that is configured to receive the optical feeder uplink beam and in dependence thereon produce and transmit a plurality of RF service downlink beams within a specified RF frequency range to service terminals, the method for use by the ground based subsystem comprising:
receiving a plurality of data modulated RF carrier signals each of which has an RF frequency within an intermediate frequency (IF) range;
producing a plurality of bandwidth allocated data modulated RF signals in dependence on the plurality of data modulated RF carrier signals;
emitting a plurality of optical signals each having a different peak wavelength that is within a specified optical wavelength range;
electro-optically modulating each of the optical signals with one of a plurality of different bandwidth allocated data modulated RF carrier signals, each of which has been modulated to carry data for at least one of the plurality of RF service downlink beams, to thereby produce a plurality of optical data signals, each of which carries data for at least one of the plurality of RF service downlink beams;
multiplexing the plurality of optical data signals to thereby produce a wavelength division multiplexed optical signal that includes data for the plurality of RF service downlink beams;
producing an optical feeder uplink beam, in dependence on the wavelength division multiplexed optical signal; and
transmitting the optical feeder uplink beam through free-space to the satellite;
wherein the producing the plurality of bandwidth allocated data modulated RF signals, in dependence on the plurality of data modulated RF carrier signals, comprises:
encoding and modulating each of the received data modulated RF carrier signals;
shaping a frequency spectrum of each of the data modulated RF carrier signals after the encoding and modulating thereof to thereby produce bandwidth allocated data modulated RF signals; and
frequency up-converting the bandwidth allocated data modulated RF signals before the bandwidth allocated data modulated RF signals are electro-optically modulated with the optical signals that each have the different peak wavelength that is within the specified optical wavelength range; and
wherein the shaping the frequency spectrum of each of the data modulated RF carrier signals is performed to allocate any one of a plurality of different amounts of bandwidth within a bandwidth range, between and inclusive of zero bandwidth and a maximum bandwidth, to any one of the service downlink beams.

9. The method of claim 8,
wherein the bandwidth allocated data modulated RF signals are filtered, downstream of the frequency up-converting, before being electro-optically modulated, to thereby filter out mixed products that result from the frequency up-converting.

10. The method of claim 8, wherein the shaping the frequency spectrum of each of the data modulated RF carrier signals is performed in a manner that also ensures that frequencies allocated to adjacent ones of the service downlink beams do not overlap one another.

11. The method of claim 8, wherein because any one of plurality of different amounts of bandwidth within the bandwidth range, between and inclusive of zero bandwidth and the maximum bandwidth, can be allocated to any one of the service downlink beams, there is an elimination of any need for the satellite to include an on-board channelizer.

12. The method of claim 8, further comprising:
producing a plurality of radio frequency (RF) carrier signals within the IF range;
receiving a plurality of data signals; and
modulating each of the plurality of data signals onto one of the RF carrier signals to thereby produce the data modulated RF carrier signals.

13. A method for enabling a ground based subsystem to produce and transmit an optical feeder uplink beam to a satellite that is configured to receive the optical feeder uplink beam and in dependence thereon produce and transmit a plurality of RF service downlink beams within a specified RF frequency range to service terminals, the method for use by the ground based subsystem comprising:

receiving a plurality of data modulated RF carrier signals each of which has an RF frequency within an intermediate frequency (IF) range;

producing a plurality of bandwidth allocated data modulated RF signals in dependence on the plurality of data modulated RF carrier signals;

emitting a plurality of optical signals each having a different peak wavelength that is within a specified optical wavelength range;

electro-optically modulating each of the optical signals with one of a plurality of different bandwidth allocated data modulated RF carrier signals, each of which has been modulated to carry data for at least one of the plurality of RF service downlink beams, to thereby produce a plurality of optical data signals, each of which carries data for at least one of the plurality of RF service downlink beams;

multiplexing the plurality of optical data signals to thereby produce a wavelength division multiplexed optical signal that includes data for the plurality of RF service downlink beams;

producing an optical feeder uplink beam, in dependence on the wavelength division multiplexed optical signal; and transmitting the optical feeder uplink beam through free-space to the satellite;

wherein each of the plurality of optical data signals resulting from the electro-optically modulating has an RF frequency within the same specified RF frequency range within which the satellite is configured to transmit the plurality of RF service downlink beams; and wherein because RF frequencies of the optical data signals resulting from the electro-optically modulating are within the same specified RF frequency range within which the satellite is configured to transmit the plurality of RF service downlink beams, there is an elimination of any need for the satellite to perform any frequency conversions when producing the plurality of RF service downlink beams in dependence on the optical feeder uplink beam.

14. A resource allocator for inclusion in a ground based subsystem for use in transmitting an optical feeder uplink beam to a satellite that is configured to receive the optical feeder uplink beam and in dependence thereon produce and transmit a plurality of RF service downlink beams, the recourse allocator including a plurality of channels each of which includes:

an encoder and modulator configured to perform encoding and modulation of one of a plurality of data modulated RF carrier signals received by the resource allocator;

a channel filter configured to shape a frequency spectrum of one of the data modulated RF carrier signals after the encoding and modulation thereof to thereby produce a bandwidth allocated data modulated RF signal; and a frequency up-converter configured to up-convert a frequency of the bandwidth allocated data modulated RF signal produced by the channel filter before the bandwidth allocated data modulated RF signal is provided to one of a plurality of electro-optical modulators (EOMs);

wherein the channel filters of the resource allocator are configured to allocate any one of a plurality of different amounts of bandwidth within a bandwidth range, between and inclusive of zero bandwidth and a maximum bandwidth, to any one of the service downlink beams.

15. The resource allocator of claim 14, further comprising:

a radio resource manager (RRM) configured to control the channel filters of the resource allocator to ensure that frequencies allocated to adjacent ones of the service downlink beams do not overlap one another.

16. The resource allocator of claim 14, wherein the resource allocator eliminates of any need for the satellite to perform any bandwidth allocation for the plurality of service downlink beams produced and transmitted by the satellite, thereby eliminating any need for the satellite to include an on-board channelizer.

17. A method for use by a resource allocator within in a ground based subsystem for use in transmitting an optical feeder uplink beam to a satellite that is configured to receive the optical feeder uplink beam and in dependence thereon produce and transmit a plurality of RF service downlink beams, the method including:

receiving a plurality of data modulated RF carrier signals;

encoding and modulating each of the received data modulated RF carrier signals;

shaping a frequency spectrum of each of the data modulated RF carrier signals after the encoding and modulating thereof to thereby produce bandwidth allocated data modulated RF signals; and frequency up-converting the bandwidth allocated data modulated RF signals before the bandwidth allocated data modulated RF signals are electro-optically modulated with optical signals that each have a different peak wavelength that is within a specified optical wavelength range;

wherein the shaping the frequency spectrum of each of the data modulated RF carrier signals includes allocating any one of a plurality of different amounts of bandwidth within a bandwidth range, between and inclusive of zero bandwidth and a maximum bandwidth, to any one of the service downlink beams.

18. The resource allocator of claim 17, wherein:

the shaping the frequency spectrum of each of the data modulated RF carrier signals also ensures that frequencies allocated to adjacent ones of the service downlink beams do not overlap one another.

19. The method of claim 17, wherein the method performed by the resource allocator eliminates of any need for the satellite to perform any bandwidth allocation for the plurality of service downlink beams produced and transmitted by the satellite, thereby eliminating any need for the satellite to include an on-board channelizer.

* * * * *